United States Patent
Moran et al.

(10) Patent No.: US 9,247,041 B2
(45) Date of Patent: Jan. 26, 2016

(54) INHERENT DISORDER READER ADAPTED TO BE CONNECTED TO A MOBILE DEVICE

(75) Inventors: Peter Malcolm Moran, Singapore (SG); Narayan Nambudiri, Singapore (SG); Satya Prakash Sharma, Setauket, NY (US)

(73) Assignee: BILCARE TECHNOLOGIES SINGAPORE PTE. LTD., Singapore (SG)

( * ) Notice: Subject to any disclaimer, the term of this patent is extended or adjusted under 35 U.S.C. 154(b) by 60 days.

(21) Appl. No.: 14/007,292

(22) PCT Filed: Mar. 26, 2012

(86) PCT No.: PCT/SG2012/000102
§ 371 (c)(1),
(2), (4) Date: May 12, 2014

(87) PCT Pub. No.: WO2012/128725
PCT Pub. Date: Sep. 27, 2012

(65) Prior Publication Data
US 2015/0126244 A1    May 7, 2015

Related U.S. Application Data

(60) Provisional application No. 61/466,967, filed on Mar. 24, 2011.

(51) Int. Cl.
| | |
|---|---|
| H04M 1/02 | (2006.01) |
| H04M 1/725 | (2006.01) |
| G06K 9/20 | (2006.01) |
| G06K 9/00 | (2006.01) |
| G07D 7/20 | (2006.01) |
| G06K 7/10 | (2006.01) |
| H04M 3/38 | (2006.01) |

(52) U.S. Cl.
CPC ............ *H04M 1/72577* (2013.01); *G06K 7/10* (2013.01); *G06K 9/00577* (2013.01); *G06K 9/209* (2013.01); *G07D 7/2033* (2013.01); *H04M 1/0264* (2013.01); *H04M 3/38* (2013.01); *G06K 2007/10524* (2013.01)

(58) Field of Classification Search
CPC .................. H04M 1/0264; G06K 2207/1016
USPC ............. 455/557, 556.1, 556.2, 575.6, 90.1, 455/90.2; 235/437, 440; 382/128
See application file for complete search history.

(56) References Cited

U.S. PATENT DOCUMENTS

| | | | |
|---|---|---|---|
| 2010/0254581 A1* | 10/2010 | Neeser et al. | 382/128 |
| 2013/0320087 A1* | 12/2013 | Moran et al. | 235/440 |
| 2014/0001261 A1* | 1/2014 | Tan et al. | 235/437 |

FOREIGN PATENT DOCUMENTS

| | | |
|---|---|---|
| JP | 2007-279728 | 10/2007 |
| WO | WO 2009/115611 | 9/2009 |
| WO | WO 2009/149048 | 12/2009 |
| WO | WO 2011/005222 | 1/2011 |

OTHER PUBLICATIONS

International Search Report (PCT/SG12/000102) Issued on Aug. 3, 2012.
European Search Report dated Aug. 19, 2014 for corresponding European Patent Application No. 12760345.4 (5 pages).

* cited by examiner

*Primary Examiner* — John J Lee
(74) *Attorney, Agent, or Firm* — Pillsbury Winthrop Shaw Pittman LLP

(57) ABSTRACT

Embodiments of the invention provide an adaptor that presents information from an inherent disorder feature as an optical signal. The adaptor is configured to direct the optical signal onto an optical processing unit built into a camera of a mobile device, such as a mobile telephone, to generate an image usable to identify an object. The adaptor is configured to be user attachable to the mobile device.

27 Claims, 14 Drawing Sheets

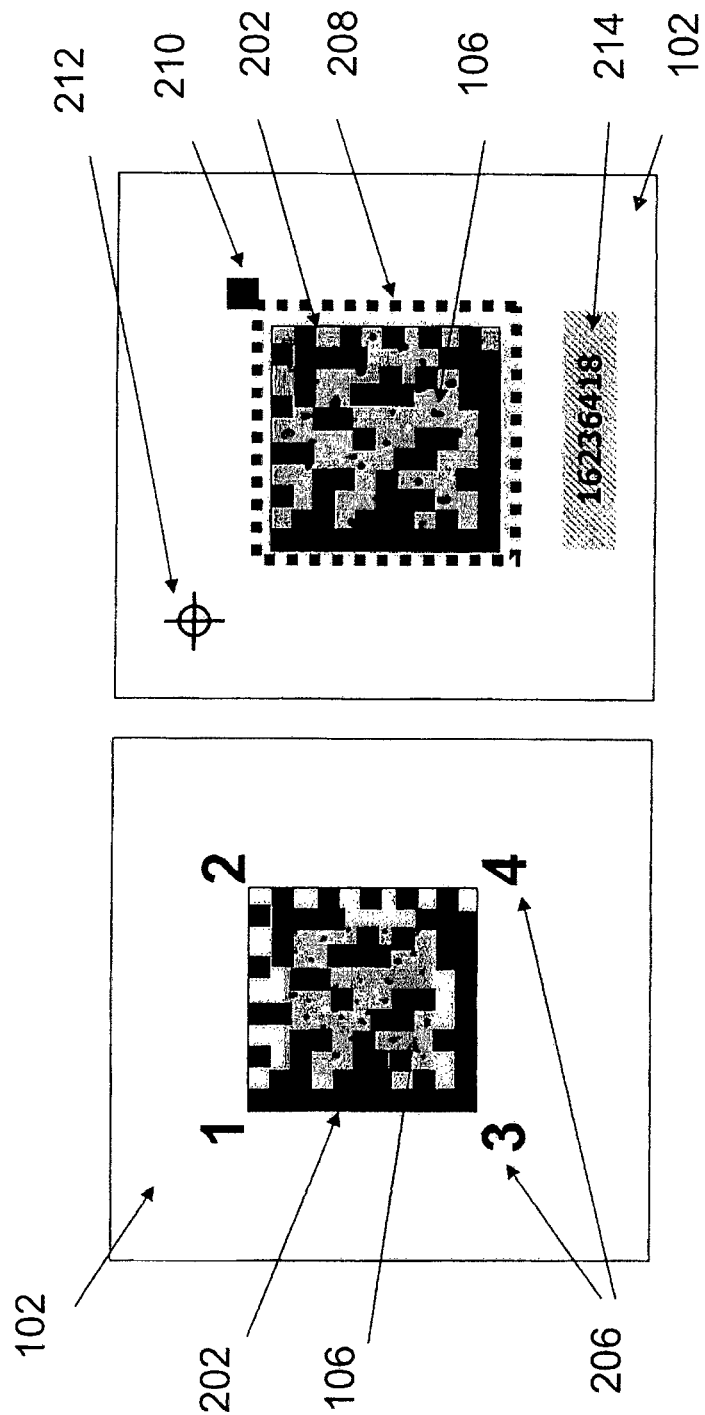

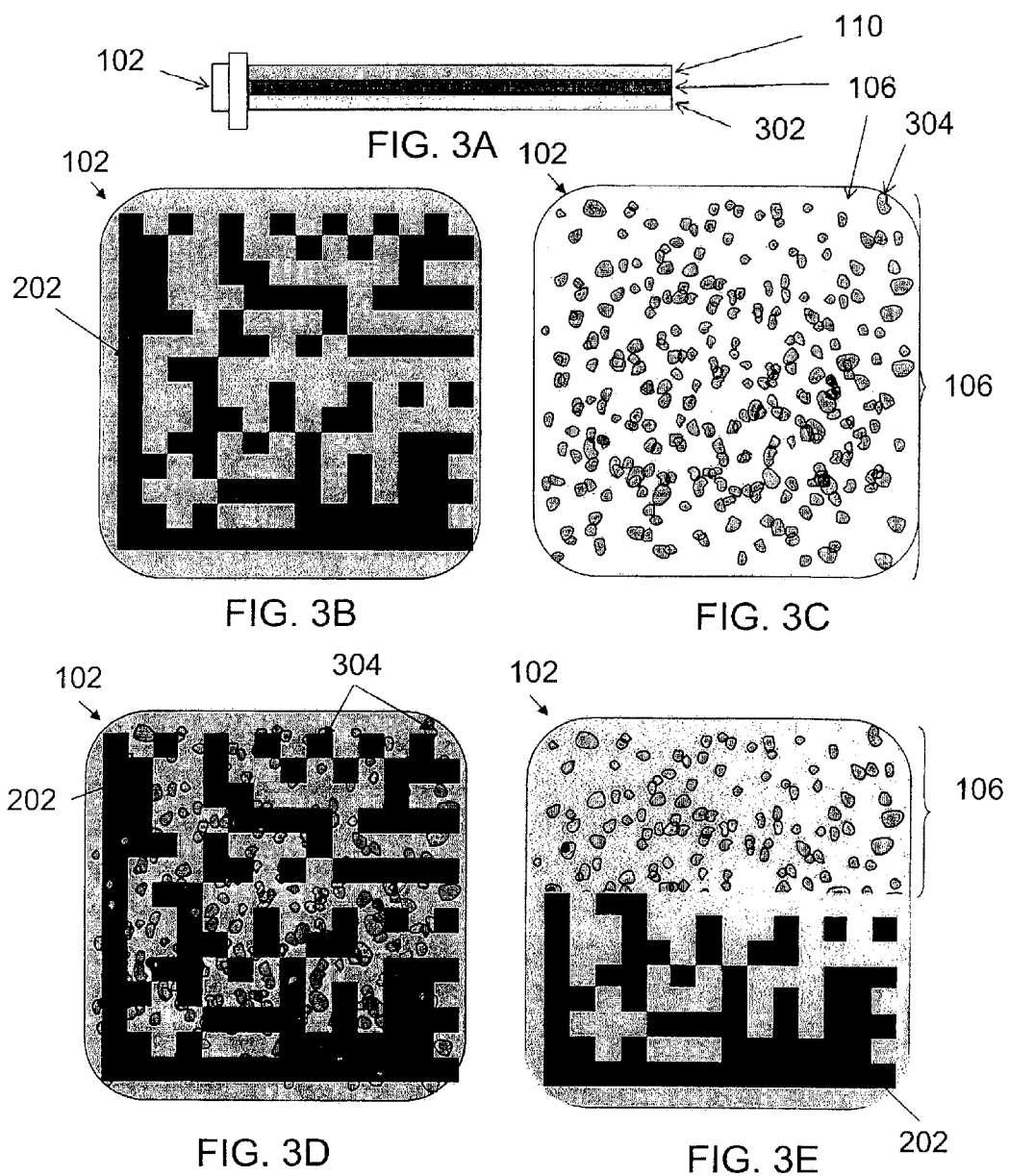

INHERENT DISORDER READER ADAPTED TO BE CONNECTED TO A MOBILE DEVICE

CROSS-REFERENCE TO RELATED APPLICATIONS

This application is a national stage entry of International Application No. PCT/SG2012/000102 filed on Mar. 26, 2012 which claims priority to U.S. Provisional Application No. 61/466,967 filed on Mar. 24, 2011, the entire contents of which are herein incorporated by reference.

FIELD OF INVENTION

Embodiments of the invention relate to the field of devices for reading authentication and identification features based on inherent disorder. In particular, the invention relates to an inherent disorder reader that is adapted to be connected to a mobile device, such as a mobile telephone.

BACKGROUND OF THE INVENTION

Identification features such as bar codes, optical characters, Radio Frequency Identification (RFID), magnetic or optical strips, and other means of identifying or authenticating objects have been used for purposes of identification, authentication, and tracking and tracing. Recently, "inherent disorder"-based features of objects have also been used either alone or in combination with other identification features to uniquely identify objects and to provide evidence of the authenticity of objects for anti-counterfeiting purposes. An "inherent disorder"-based feature is a feature based on a disordered material, wherein the structure of the disorder is used to identify the object. The disordered material may be a part of the object itself, or may be part of a tag that is affixed to the object. Further, the disordered material may include a disordered coating, composite, or structure.

There are numerous previously known examples of the use of inherent disorder for identification and authentication purposes. For example, Ingenia Technology Limited, of London, UK, has described a system that uses the inherent disorder of fibers within paper, mapped using laser-speckle interferometry, to uniquely identify the paper. A more complete description of this technology can be found in PCT application WO 2006/016114.

Another previously known use of inherent disorder is shown in U.S. Pat. No. 7,380,128, assigned to Novatec, SA, of Montauben, France. This patent shows use of random bubbles within a transparent polymer for identification and authentication. Optical methods are used to read the three-dimensional layout of the bubbles within the polymer. This information can be used to provide a unique signature for a "bubble tag", which is difficult or impossible to replicate.

Other inherent disorder-based identification and authentication technologies include use of randomly distributed quantum dots or nanobarcodes, use of ink containing magnetic particles arranged in a disordered pattern, use of random "jitter" in the magnetic stripes of credit cards, and use of random distribution of taggant particles that are invisible to human vision on an article (see PCT application WO 2005/104008).

Additional inherent disorder-based tags that use a combination of magnetic and/or magnetisable and/or conductive and/or semi-conductive and/or optically active particles and/or optically distinguishable particles have been reported by the present applicant, Bilcare Technologies. These technologies are further detailed in commonly-owned PCT applications WO 2005/008294, WO 2006/078220, WO 2007/133164, WO 2007/133163, and WO 2009/105040.

Various signal detection systems based on optical, magnetic, and magneto-optical effects are used to read these inherent disorder features. Once read, information on the inherent disorder features can be processed either in the reading device itself or in a back-end computer system to use the information for identification and/or authentication purposes.

SUMMARY OF THE INVENTION

One embodiment of the invention provides an inherent disorder reader, including an adaptor that presents information from an inherent disorder feature as an optical signal. The adaptor is configured to direct the optical signal onto an optical processing unit built into a camera of a mobile device to generate an image usable in the mobile device to identify an object or that can be transmitted by the mobile device to a remote device (e.g. computer/server) which is able to use the image. The adaptor is further configured to be user attachable to the mobile device. In some embodiments, the adaptor is configured to be removably attached to the mobile device. In some embodiments, the mobile device may be a mobile telephone, such as a commercially available cellular phone.

In some embodiments, the adaptor is configured to be attached to the mobile device using a suction cup. In various embodiments, the adaptor is configured to be attached to the mobile device using at least one of a suction-based fastener, a clipping fastener, a magnetic fastener, a threaded fastener, a hook and loop fastener, an adjustable bracket, a re-attachable adhesive, and a permanent adhesive.

In some embodiments, the inherent disorder feature is a magnetic inherent disorder feature, and the adaptor uses a magneto-optical substrate to present information from the inherent disorder feature as an optical signal. In some embodiments, the adaptor is further able to read an optical feature of the tag. The optical feature includes at least one of a barcode, a two-dimensional barcode, printed text, printed markings (such as fiducial markings) and printed digits.

In some embodiments, the adaptor includes an optical system configured to decrease the focal length and increase the magnification of a wide-angle camera in the mobile device, to adapt the camera to resolve small features. Here "small features" means features smaller than what the original mobile device camera was designed to resolve, i.e. the adapter decreases the focal distance but increases the system resolution.

In some embodiments, the inherent disorder feature includes a disordered array of fluorescing particles, and the adaptor includes a light source that emits light at a wavelength such that the fluorescing particles fluoresce. In some embodiments, the inherent disorder feature includes a three-dimensional inherent disorder feature, and the adaptor includes a plurality of light sources that illuminate the three-dimensional feature from a plurality of angles. In some embodiments, the inherent disorder feature includes a random arrangement of optical fibers, and the adaptor includes a light source having a predetermined position with respect to an optical system that directs light to the optical processing unit, such that when light from the light source illuminates one end of a set of the optical fibers, the adaptor directs an image representing a pattern of light from the other end of a subset of the illuminated set of optical of optical fibers to the optical processing unit.

In some embodiments, the invention provides an authentication system for identifying an object based on an inherent disorder feature. The system includes a mobile device having a built-in digital camera or other digital imaging system, the mobile device configured to receive an optical signal on the camera, and to use the camera to generate an image usable to identify an object. The system also includes an adaptor that presents information from the inherent disorder feature as an optical signal. The adaptor is configured to direct the optical signal onto the digital camera or imaging device built into the mobile device. The adaptor is further configured to be user attachable to the mobile device. In some embodiments, the adaptor is configured to be removably attached to the mobile device. In some embodiments, the adaptor is configured to receive power from the mobile device.

In some embodiments, the mobile device may be a mobile telephone. In some embodiments, the mobile device includes a wireless communication capability that is used to communicate information from the image to a remote server to identify the object.

In some embodiments, the mobile device includes a user interface, through which the authentication system interacts with a user. In some embodiments, the mobile device includes a display that is used to display information relating to identifying the object. In some such embodiments, the display may be used to show the image that is used in the mobile device to identify the object.

In some embodiments, the adaptor is configured to be attached to the mobile device of the system using a suction cup. In some embodiments, the adaptor is configured to be attached to the mobile device of the system using at least one of a suction-based fastener, a clipping fastener, a magnetic fastener, a threaded fastener, a hook and loop fastener, an adjustable bracket, a re-attachable adhesive, and a permanent adhesive.

In some embodiments, the inherent disorder feature used by the system for identification of objects is a magnetic inherent disorder feature, and the adaptor uses a magneto-optical substrate to present information from the inherent disorder feature as an optical signal. In some embodiments, the adaptor further includes an optical reader that reads an optical feature. In some such embodiments, the optical feature includes at least one of a barcode, a two-dimensional barcode, printed text, and printed digits.

In some embodiments, the inherent disorder feature includes a disordered array of fluorescing particles, and the adaptor includes a light source that emits light at a wavelength such that the fluorescing particles fluoresce. In some embodiments, the inherent disorder feature includes a three-dimensional inherent disorder feature, and the adaptor includes a plurality of light sources that illuminate the three-dimensional feature from a plurality of angles. In some embodiments, the inherent disorder feature includes a random arrangement of optical fibers, and the adaptor includes a light source having a predetermined position with respect to an optical system that directs light to camera, such that when light from the light source illuminates one end of a set of the optical fibers, the adaptor directs an image representing a pattern of light from the other end of a subset of the illuminated set of optical fibers to the camera.

In some embodiments, the mobile device communicates with a remote database to authenticate the object. In some embodiments, the mobile device includes software that authenticates the object on the mobile device.

In some embodiments, the invention provides a device for identifying an object. The device includes a mobile device including an imaging device, and an adaptor configured to modify a property of an electromagnetic wave in response to an inherent disorder feature on the object to be identified, and to ensure that the modified electromagnetic wave is incident and focused on the imaging device, such that the imaging device is able to derive an image containing information usable to identify the object. The adaptor is configured to be user attachable to the mobile device. In some embodiments, the adaptor is configured to modify at least one of the wavelength, magnification, polarization, or energy of an electromagnetic wave according to an inherent disorder feature.

In some embodiments, the mobile device is a mobile telephone. In some embodiments, the adaptor is configured to be user attachable to the mobile device using a suction cup. In some embodiments, the inherent disorder feature is a magnetic inherent disorder feature, and the adaptor uses a magneto-optical substrate to modify a property of the electromagnetic wave.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 2A and 2B show further example tags with identification features that can be read in accordance with an embodiment of the invention;

FIGS. 3A-3E show various views of an example tag on which magnetic and optical information overlap, and that can be read in accordance with an embodiment of the invention;

DESCRIPTION

Figure 1A:
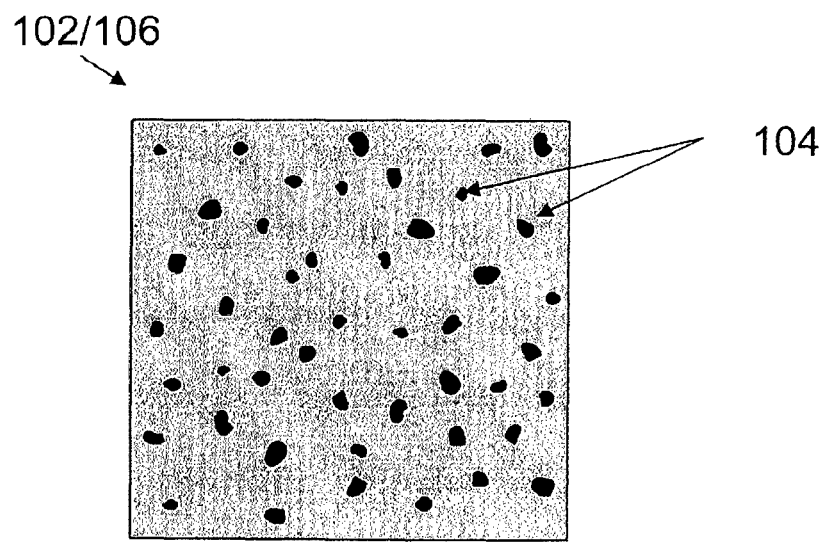
FIGS. 1A and 1B show top and perspective views, respectively, of magnetic particles used in a tag to be read as an inherent disorder feature in accordance with an embodiment of the invention.

Embodiments of the invention provide an adaptor for enabling reading inherent disorder features that attaches to another device that includes both a camera function and a processing and/or communication function. For example, the adaptor may attach to a mobile telephone or other mobile device, a web camera connected to a computer that is connected to a network or communication system, a PDA, a laptop or tablet device that includes a camera, etc. This permits features of the mobile device, such as a built-in camera, display, and communications capabilities, to be used to simplify and reduce the cost of the reader of inherent disorder features. Because many mobile devices, such as mobile telephones and "smartphones", that are currently in wide-spread use typically include an camera, generally an adaptor for reading an inherent disorder feature will enable imaging of the inherent disorder feature by the camera in a mobile device for detection and reading. Additionally, because the adaptor according to embodiments of the present invention can be used with a wide range of devices, it is not necessary to alter the design of the adaptor for each device to which it may be attached.

As used herein a "mobile device" will generally be used to indicate a device having a camera, a processor, a user interface, and preferably real-time or nearly real-time communication capabilities. Such devices will generally be commercially available from a variety of sources. Thus, mobile devices include such devices as mobile telephones with built-in cameras, PDAs with cameras and communication capabilities and/or processing capabilities, tablet computers with cameras and communication capabilities, laptop computers with cameras and communication capabilities, or even devices that are not conventionally considered "mobile", such as a desktop computer system having communication capabilities and a web-cam attached. As used herein, "processing capabilities" means that the mobile device is configured to run third-party software applications. Also, herein "third-party", when used in the context of the mobile device, means any software provider other than the manufacturer of the mobile device. For example, the group manufacturing the adaptor may also provide an application to run on the mobile device to process the image that is captured, such that it is usable for authenticating an object by using the inherent disorder feature. Such an ability to run third-party software applications is typical in current commercially available "smart phones", PDAs, tablet computers, etc. Most current commercially available dedicated digital cameras, for example, while they certainly include processors, do not include an ability to run third-party software, and so would not typically possess "processing capabilities", as that term is used herein.

The adaptor according to various embodiments of the invention will generally be user attachable to such a mobile device. By "user attachable" it is generally meant that such an adaptor can be attached by its user (rather than by the manufacturer of the adaptor or mobile device) to a wide range of such mobile devices, and is not specially designed to be permanently attached to just one such device. In practice, the adaptor may be attached permanently (according to its user's wishes) to a particular device, but the user decided to which device, from among a range of devices, the adaptor would be attached, and attachment of the adaptor to the device was generally carried out by the user, at the user's option, rather than by the manufacturer of the adaptor or the device. In some embodiments, the adaptor will be "removably attachable", meaning that it is attached to a device in such a way that it can be easily detached from the device. In other embodiments, the adaptor, once it has been attached to a device by a user, may not be easily detachable. For example, an adaptor may be attached using a "permanent" adhesive. While such an adhesive may be removable, it is not easily removable.

A first example embodiment of the invention reads an inherent disorder feature based on random positions of magnetic particles in a fixed area, such that the area possesses a unique pattern of such magnetic particles at a fine resolution. As shown below, a tag for use with this embodiment includes a disordered array of magnetic or magnetisable particles forming a magnetic fingerprint region. To enhance understanding of systems for reading such inherent disorder features, tags employing such an inherent disorder features will be discussed below with reference to FIGS. 1-3, and general designs for readers for reading such features will be discussed with reference to FIGS. 4-5. An overview of an authentication system employing such readers will be discussed with reference to FIG. 6, and embodiments of the invention, in which certain optical elements of a reader are placed into an adaptor that can be attached to a mobile device will be discussed with reference to FIGS. 7-14.

Figure 1B:
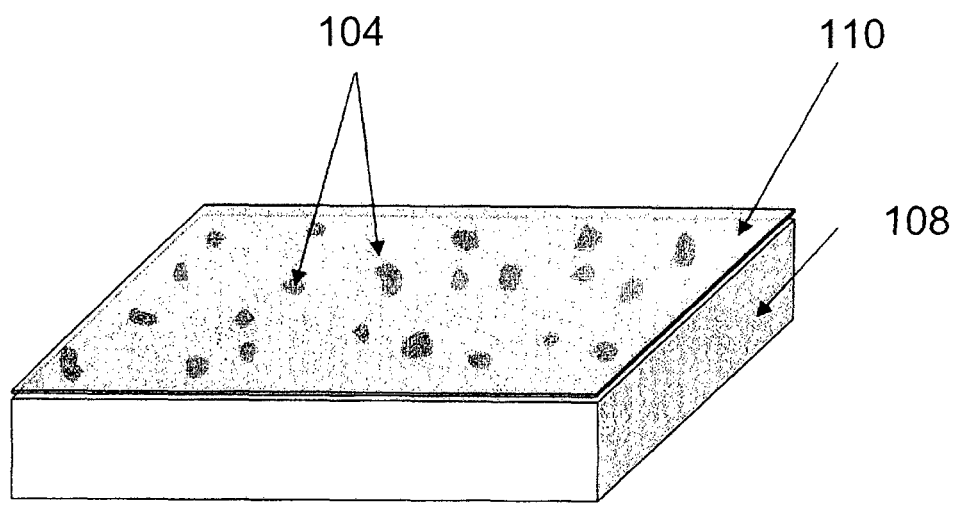

FIG. 1A and FIG. 1B respectively show a top view and a perspective view of magnetic particles 104 (preferably of high magnetic coercivity) used in a tag 102 to be read as an inherent disorder feature in accordance with an embodiment of the invention. To obtain a clear magneto-optical signal, particles 104 of high coercivity magnetic materials which have a high magnetic flux forming the magnetic fingerprint region 106 should be used. FIG. 1B shows that in this embodiment, the magnetic particles 104 form a layer sandwiched between a base layer 108 and a cover layer 110. The base layer 108 and cover layer 110 are generally formed from films of material, with the base layer 108 providing a support for the magnetic particles 104 and the cover layer 110 providing protection from the environment and from abrasion. The maximum thickness that can be used for the cover layer 110 is dependent on the strength of the magnetic fields produced by the magnetic particles 104 (the strength of the magnetic field is itself a function, for example of the remnance magnetization of the magnetic particles 104, their size, the orientation of the magnetic particles 104 and the direction of magnetism), the size and distance between the particles, the sensitivity of the reading element being used to read the magnetic fields, and the expected resolution of the overall system.

The magnetic particles 104 may be distributed within a non-magnetic (or weakly magnetic) matrix material, such as a polymeric material, a metallic material, a glass material, or a ceramic material. The non-magnetic or weakly magnetic material provides one or more of: protection for the particles (particularly protection against moisture if the particles are prone to corrosion), cohesion between the particles and the other layers present (i.e. the non-magnetic material locks the magnetic particles in place—a form of adhesive, for example), and ease of application of the particles to the base or cover layer. In such cases the magnetic particles 104 is understood to include the non-magnetic or weakly magnetic matrix material where applicable. In certain cases there may be no specific base layer 108 and the magnetic particles 104 may be directly in contact with an adhesive layer at the base of the tag, or they may be exposed.

The magnetic particles 104 may include a high coercivity material. An example of such a high coercivity material is a neodymium magnet comprising Nd, Fe and B. The magnetic particles 104 may include a ferrimagnetic material, an antiferromagnetic material, a ferromagnetic material, or domains of varying magnetic properties within a continuous material (including voids causing variable magnetic properties) and combinations thereof. The ferromagnetic material may be selected from the group consisting of MnBi, CrTe, EuO, $CrO_2$, MnAs, Fe, Ni, Co, Gd, Dy, corresponding alloys and oxides of Fe, Ni, Co, Sm, Gd, Dy, and combinations thereof.

FIGS. 2A and 2B show further examples of tags 102 with additional identification features. Since additional identification features provide additional security or information, multiple identification features may be adopted in many applications. Some of these additional identification features that might be read in accordance with embodiments of the invention include, but are not limited to, magnetic barcodes, magnetic borders, magnetic alphanumeric characters, magnetic fiducial marks, optical barcodes (linear and 2-dimensional, including various industry standards such as DataMatrix), optical fiducial marks, optical alphanumeric characters, and other visible markings. As further examples, the tag 102 may include a Radio Frequency Identification (RFID) chip, security inks or a hologram. A barcode 202 is shown in FIG. 2A as overlapping with the magnetic fingerprint region 106. The barcode 202 may be printed in regular ink, or in some embodiments may be printed using covert inks such as ultraviolet or infrared "optical" inks that cannot be easily detected by the naked human eye under white light but can be detected and read by using a suitably adapted reading device or by illuminating the tag 102 with one or more particular wavelengths of the electromagnetic spectrum. Magnetic and optical identification features may be positioned at the same position with respect to the scan area by means of using multiple layers, or may be positioned in any other predetermined spatial relationship to each other (including both overlapping and non-overlapping configurations).

FIG. 2A shows a tag 102 with a magnetic fingerprint region 106. A two-dimensional barcode 202 is partially overlapping the magnetic fingerprint region 106 and a plurality of magnetic alphanumeric characters 206 are positioned at the four corners of the two-dimensional barcode 202. Note that although the magnetic fingerprint region 106 is shown in FIG. 2A and FIG. 2B, the fingerprint region 106 may be situated behind an opaque cover layer that the barcode 202 is printed on. Therefore, a user may not actually see the fingerprint region 106. Furthermore, magnetic and optical features may overlap while placed on the same or different layers of a tag 102.

FIG. 2B shows another example of a tag 102 with a magnetic fingerprint region 106. A two-dimensional barcode 202 is overlapping the magnetic fingerprint region 106. The two-dimensional barcode 202 is surrounded by a border 208, and a first fiducial marking 210 is positioned at the upper-right corner of the border 208. A second fiducial marking 212 is positioned on the upper-left corner, adjacent to the second fiducial marking 208. Magnetic alphanumeric characters 214 are positioned adjacent to the border 208.

A single reader (which may include an adaptor attached to a mobile device, in accordance with embodiments of the invention) may read overlapping optical and magnetic features of the tag 102. Overlapping and similar terms are to be understood to mean located in the same area, superimposed, or on top of each other. Optical and magnetic features of the tag 102 may overlap on the same or different layers of the tag 102. Reading overlapping optical and magnetic features may allow for a smaller tag 102. It also may provide more accurate correlation between the magnetic and optical features, since the optical features that are used as a reference for fingerprint matching of the magnetic features are physically closer to the magnetic features. Due to the small scale of the inherent disorder features (or small area covered by the relevant disorder features) compared to the optical features, in some cases, the optical features of the tag 102 may be read at a distance, using a long range reading portion of the reader, while the magnetic features (i.e., the inherent disorder feature of the tag) may be read by a close range or contact reading portion. In some systems, at least some of the optical features may be read by both the short- and long-range portions of the reader.

FIGS. 3A to 3E show various views of an example tag 102 where the magnetic information and the optical information overlap. In FIG. 3A, the tag 102 may include a cover layer 110 which has an optical barcode (not shown) (herein a "barcode" is taken to include datamatrix codes and other machine readable optical information) printed on its top surface, a magnetic fingerprint region 106 which may be in the form of a layer positioned below the cover layer 110, and an adhesive layer 302 positioned below the magnetic fingerprint region 106. Note that a barcode is shown as the optical marking purely for illustrative purposes. The description that follows for this figure and other figures should be considered to be general and not confined to barcodes.

FIG. 3B shows a top optical view of the tag 102. Optical information in the form of a barcode 202 which has been printed on the surface of the tag 102 may be seen from the top view of the tag 102.

FIG. 3C shows a top magnetic view of the tag 102. If the user is able to take a magnetic image of the tag 102, the user can effectively look "through" the cover layer 110 and the optical information 202 and "see" the magnetic particles 304 or the magnetic fields contained within the magnetic fingerprint region 106.

FIG. 3D shows a top view of the composite image (i.e. the optical and magnetic features superimposed on each other). It is clear that when viewed from the top, the barcode 202 and the magnetic particles 304 overlap each other.

When the tag 102 is scanned by a reader capable of reading only optical or magnetic features in a given area, FIG. 3E illustrates the resulting scan, wherein, for purposes of illustration, one half of the magnetic fingerprint region 106 is scanned and the other half of the optical barcode 202 is scanned. In the case where the optical barcode 202 is a datamatrix code (as shown), or another two-dimensional barcode symbol, scanning only half of the area may not be sufficient to fully interpret the information encoded in the bar code.

Generally, the optical features (i.e., the barcode 202) may be read using, for example, conventional methods of reading barcodes. For example, an LED or other light source may be used to illuminate the barcode 202, and an image of the barcode 202 may be made incident on a charge-coupled device (CCD) or a complementary metal-oxide-semiconductor (CMOS) image sensor. In accordance with various embodiments of the invention, this image sensor may be integrated into a mobile device, while portions of the optics that also permit the reading of an inherent disorder feature are included in an adaptor that attaches to the mobile device. The image from the image sensor may then be analyzed to read the information stored in the barcode. Barcode readers, including using the camera of a mobile phone to read a barcode, are known in the art, and such barcode reading technology could be used in a portion of an adaptor for reading inherent disorder features on a mobile phone or other mobile device, in accordance with an embodiment of the invention. Generally, the cameras on mobile devices can be used to read barcodes and other optical features without an adaptor, but, as discussed below, an adaptor according to one of the embodiments of the invention also permits the mobile device to be used to read an inherent disorder feature, such as the magnetic feature discussed above. Barcode readers are generally suitable for reading a number of one-dimensional bar code symbologies, including (but not limited to) EAN/UPC, RSS, Code 39, Code 128, UCC/EAN 128, ISBN, ISBT, Interleaved, Matrix, Industrial and Standard 2 of 5, Codabar, Code 93/93i, Code 11, MSI, Plessey, Telepen, and postal codes, as well as two-dimensional bar code symbologies, including (but not limited to) Data Matrix, PDF417, Micro PDF 417, Maxicode, QR, Aztec, and EAN.UCC composite. A reader for the magnetic particle-based inherent disorder feature described above is described in international application PCT/SG2010/000259, by Bilcare Technologies Singapore Pte. Ltd., published on 13 Jan. 2011 as publication WO/2011/005222.

Figure 4:
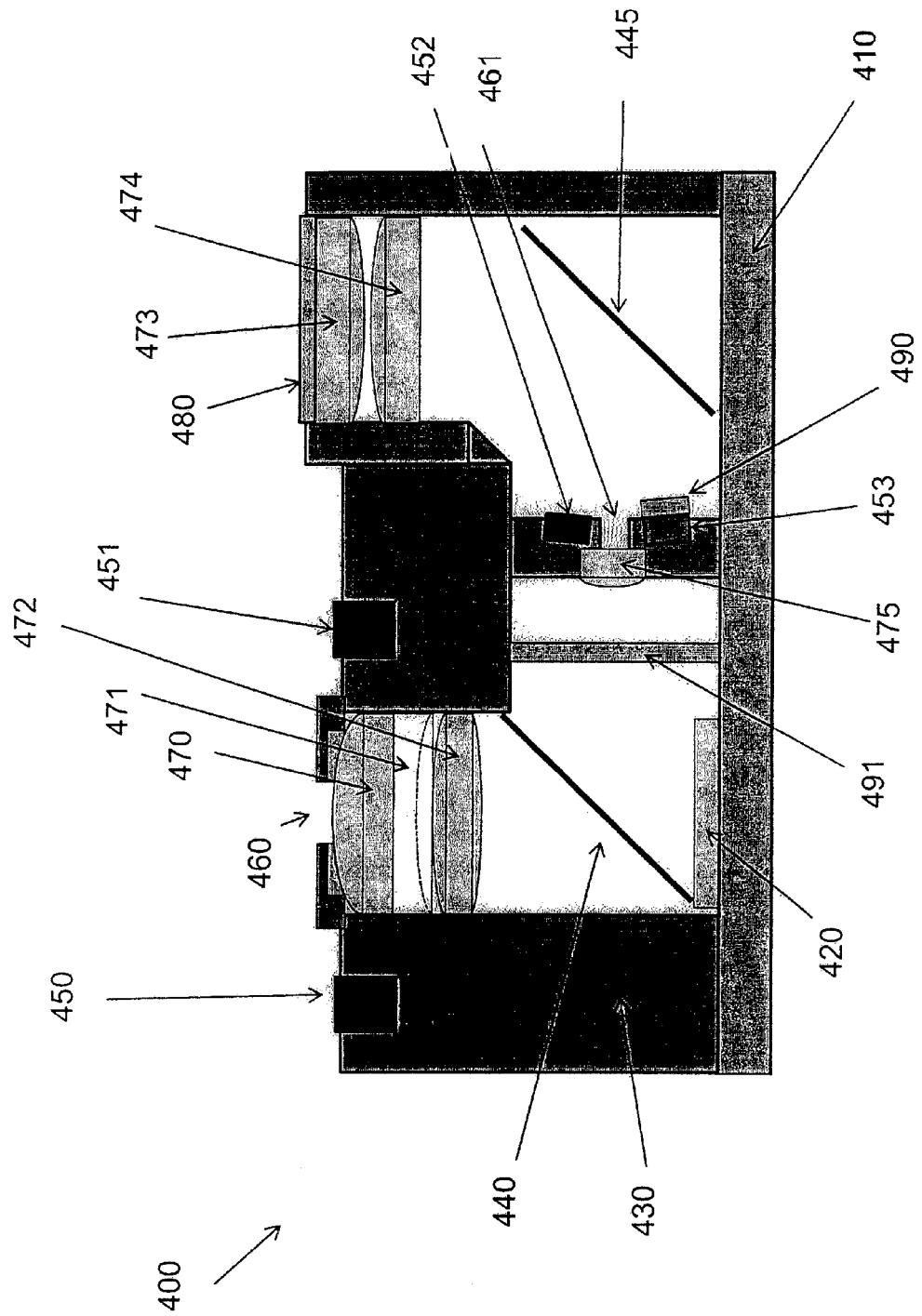
FIG. 4 shows a cross-sectional view of an example integrated reader having both a near-field inherent disorder reader and a far-field identification and/or authentication feature reader.

Referring now to FIG. 4, an example of an integrated reader 500 that reads both a near-field magnetic inherent disorder feature, and far-field optical identification features is described. This description is intended only to provide an understanding of the technology which may be employed in an adaptor according to an embodiment of the invention. An adaptor according to an embodiment of the invention would not include, for example, the optical processing unit shown in FIG. 4, since this would be provided by the mobile device to which the adaptor is attached.

In the example integrated reader shown in FIG. 4, An optical processing unit (such as a CMOS image sensor) 420 is mounted on a printed circuit board (PCB) 410. There is a beamsplitter 440 mounted in front of the optical processing unit 420 at 45° to the surface of the imaging. Light that passes through the beamsplitter 440 from above comes from the optics which are designed to obtain an optical image of a remote object or surface. These optics include a series of lens elements 470, 471 and 472 and a pinhole 460. The remote object or surface is preferably illuminated by lighting elements 450 and 451 (these lighting elements could, for example be light emitting diodes, "LED"s).

Light that is reflected towards the optical processing unit 420 by the beamsplitter 440 comes from the magneto-optic/optic imaging portion of the authentication unit 400 that is designed to obtain magnetic and optical information (e.g., which may contain barcode information, fiducial marks, etc.) from an object or surface which is in contact or in close proximity to the magneto-optical substrate 480. This portion of the authentication unit comprises a first polarizer 490 situated in front of a lighting element 453 (which could be an LED). It may also comprise a second lighting element 452 (which may be an LED of a different wavelength than the lighting element 453). A mirror surface 445 (which could alternatively be a prism) is used to redirect light. This portion of the authentication unit 400 also comprises a series of lens elements 473, 474 and 475 and a pinhole 461. There is also a second polarizer 491 and the magneto-optical substrate 480. In addition, the authentication unit 400 has a protective housing 430 which both protects the various components of the housing and also ensures that at least some of the components are kept at a substantially fixed spatial relationship to each other.

Note that the beamsplitter 440 could be any type of beamsplitter, e.g. a plate beamsplitter or a cube beamsplitter. Alternatively, it could be replaced by a switchable mirror, and similar effects could be obtained using various combinations of switchable mirrors, beamsplitters, electronic shutters, prisms, etc. This configuration enables the authentication unit 400 to read optical information (such as barcodes) remotely and also to read magnetic/optical information (i.e., an inherent disorder feature) at close proximity to or in contact with magneto-optical substrate 480.

In addition, in FIG. 4 and subsequent illustrations, it is contemplated that the outer surface of the magneto-optical substrate 480 may be coated with various layers including faraday rotating layers, protective layers and mirror layers. The mirror layer may be a dichroic (or dielectric) mirror layer, such that one range of wavelengths of light are able to pass through the coating while another range of wavelengths are reflected by the coating. For example, the dichroic mirror coating may be chosen to substantially transmit light with wavelengths longer than ~590 nm (e.g. orange/red light), while substantially reflecting light at wavelengths below ~590 nm (e.g. yellow/green/blue/violet light). By controlling the light emitted from the lighting elements 452 and 453 this dichroic mirror coating is able to provide clean magnetic and optical images of the same substrate simultaneously. For example, if the lighting element 452 (which preferentially has no polarizer in front of it) is chosen to be red (i.e. wavelength above ~590 nm) then this unpolarized red light will pass through the dichroic mirror and reflect off the surface or tag which is in front of the magneto-optical substrate. This reflected light will again pass through the dichroic mirror and be directed to the optical processing unit 420. Consequently, red light hitting the optical processing unit 420 (from this optical path) will contain only optical information about the surface or object in front of the magneto-optical substrate 480. If the lighting element 453 is chosen to emit green light (wavelength less than ~590 nm), this green light will be polarized by polarizer 490 and will be reflected by the dichroic mirror layer. Therefore, this reflected green light hitting the optical processing unit 420 will not carry any optical information about the surface or object in front of the magneto-optical substrate 480. Instead, the green light hitting optical processing unit 420 carries magnetic information about the surface or object in front of magneto-optical substrate 480.

This "information" is enhanced by rotating the polarization angle of the polarizer 491 with respect to the rotation of the polarizer 490. For example, let us assume the idealized case where the magneto-optical substrate locally rotates the reflected green light by 5° clockwise if a strong local magnetic north field is present at that point, but locally rotates the reflected green light by 5° anti-clockwise if a strong local magnetic south field is present. If no local magnetic field is present, then the reflected green light maintains its polarization angle and is not rotated. Assume, for example, that the polarization angle of the polarizer 491 is rotated clockwise by 85° with respect to the polarizer 490. If no magnetic field is present then the reflected green light hitting the polarizer 491 will be polarized at 85° degrees from the polarization angle of the polarizer 491, and consequently very little light will pass through. If, however, there was a local south field, the reflected green light will have been rotated by 5° anti-clockwise, and consequently when it hits the polarizer 491, it will be polarized at 90° to the polarizer 491. This means that very little, if any light will pass through. If, however, a local north field were present, the reflected green light would be rotated by 5° clockwise, and when it hits the polarizer 491, it would therefore be polarized at only 80° from the polarization direction of the polarizer 491. Therefore, north magnetic fields would appear as bright spots on an image taken by the optical processing unit 420, south magnetic fields would appear as local dark/black regions, and the non-magnetic areas would appear as a dark (but not quite black) background. Using this kind of configuration, the reflected green light can be used to obtain magnetic information from a surface or substrate in contact or close proximity with the magneto-optical substrates 480.

Note that certain optical processing units, such as CMOS sensors, are well-suited to split the image into red, green, and blue components since their surface is an array of individual red, green, and blue light sensors. Therefore images taken with such CMOS sensors are inherently split into their various red, green, and blue components (and, in fact, full color images from such sensors are a somewhat artificial combination of these three components). Therefore, if a CMOS sensor is used for the optical processing unit 420, the images from red light and green light are automatically split, due to the nature of the CMOS sensor. It will be understood that the measured red, green and blue signals from the CMOS may not be a pure representation of each of the red, green and blue light components respectively, and some mathematical subtraction/normalization steps may be needed. These techniques are well-known as the effect is inherent in many CMOS sensors, so their manufacturers typically provide documentation on how to achieve this.

One problem which may arise from this, however, is cross talk between the signals from the two different light paths (the one which is adapted to optically image remote surfaces and objects and the other which is adapted to image magnetic/optical surfaces and objects which are in front of the magneto-optical substrate 480). Among the other ways to deal with this is, for example, to have the lighting elements 450 and 451 emitting green light, and to have the lighting elements 452 and 453 switched off, when it is desired to read a remote optical surface or object. With this situation, and assuming that the magneto-optical substrate 480 is coated with the dichroic mirror layer described above, substantially all the green light that reaches the optical processing unit 420 will be from the desired remote imaging optical path. For the purposes of imaging the substrate in this case, the red and other light can be ignored, as it will contain cross-talk from the optical path containing the magneto-optical substrate 480. When it is desired to obtain information from the optical path that includes the magneto-optical substrate, then the lighting elements 450 and 451 may be switched off, and the lighting elements 452 and 453 can be used (simultaneously or sequentially) to illuminate the surface/object in front of the magneto-optical substrate 480. A shutter (not shown in FIG. 4) may be used to close off the pinhole 460. Alternatively, as described previously, the beamsplitter 440 could actually be a switchable mirror which is activated to become completely reflective.

Note that in FIG. 4 and other illustrations, various non-key components are purposefully left out in order to facilitate clear description of the key components. An example of a component which is purposefully omitted in FIG. 4 is a flex circuit/cable to enable the printed circuit board 410 to communicate with another mother board in the device in which the reader 400 is housed. Also, a variety of modifications could be made to the design. For example, although lighting elements 450, 451, 452, and 453 are shown as single lighting elements, it will be understood that multiple lighting elements could be used in place of each of these lighting elements. Further, different types of lighting, such as ring lighting could also be used.

Figure 5A:
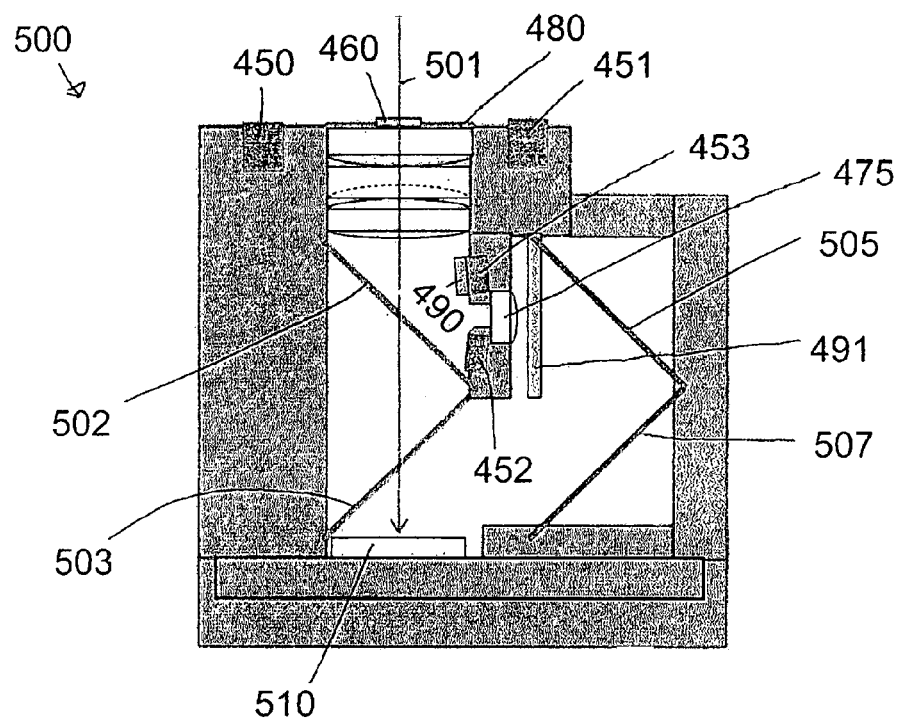
FIGS. 5A and 5B show cross-sectional view of another example integrated reader.
Figure 5B:
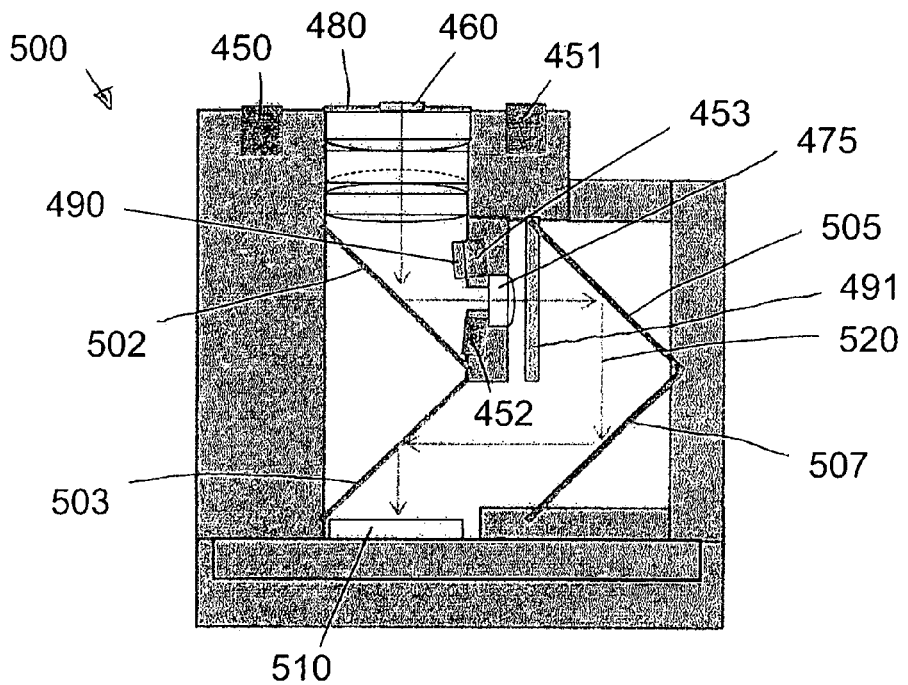

Similar designs, combining reading of conventional identification features, such as barcodes with reading of inherent disorder features, such as the magnetic particle-based inherent disorder feature discussed above, may have only a single area through which the features are read. This may provide more compact designs. For example, FIGS. 5A and 5B show an integrated reader 600, in which dichroic mirrors 502 and 503, and mirrors 505 and 507 direct light from far-field reading along the optical path 501 as shown in FIG. 5A, and light from near-field reading along optical path 520 as shown in FIG. 5B. As with FIG. 4, FIGS. 5A and 5B show only example readers, intended to impart an understanding of the optics of a system for reading both optical and inherent disorder features. In an adaptor according to embodiments of the invention, various elements of the reader shown in FIGS. 5A and 5B, such as the optical processing unit 510, may be part of the mobile device, rather than the adaptor.

When the reader 600 is being used for reading, e.g., a conventional barcode or other optical identification feature, as shown in FIG. 6A, the lighting elements 450 and 451 may be switched on, and the lighting elements 452 and 453 may be switched off. The dichroic mirrors 502 and 503 are configured such that they permit the light from the lighting elements 450 and 451 to pass through (to be projected onto the optical processing unit 510), while reflecting the light from the lighting elements 452 and 453.

When the reader 500 is being used for reading a magnetic inherent disorder feature, as shown in FIG. 5B, the lighting elements 452 and 453 may be switched on, and the lighting elements 450 and 451 may be switched off. Light from the lighting elements 452 and 453 reflects off of a dichroic or reflective layer of the magneto-optical substrate 480, and is reflected by the dichroic mirror 502 so that it passes through the lens system 475 and the polarizer 491 before being directed by the mirrors 505 and 507 and the dichroic mirror 503 onto the optical processing unit 510.

Although an optional pinhole 460 is shown in the magneto-optical substrate 480 in the reader shown in FIGS. 5A and 5B, it will be recognized that through use of a dichroic mirror layer in the magneto-optical substrate 480, particular wavelengths of light may pass through the magneto-optical substrate 480 during far-field reading, and the pinhole 460 may be absent.

Figure 6:
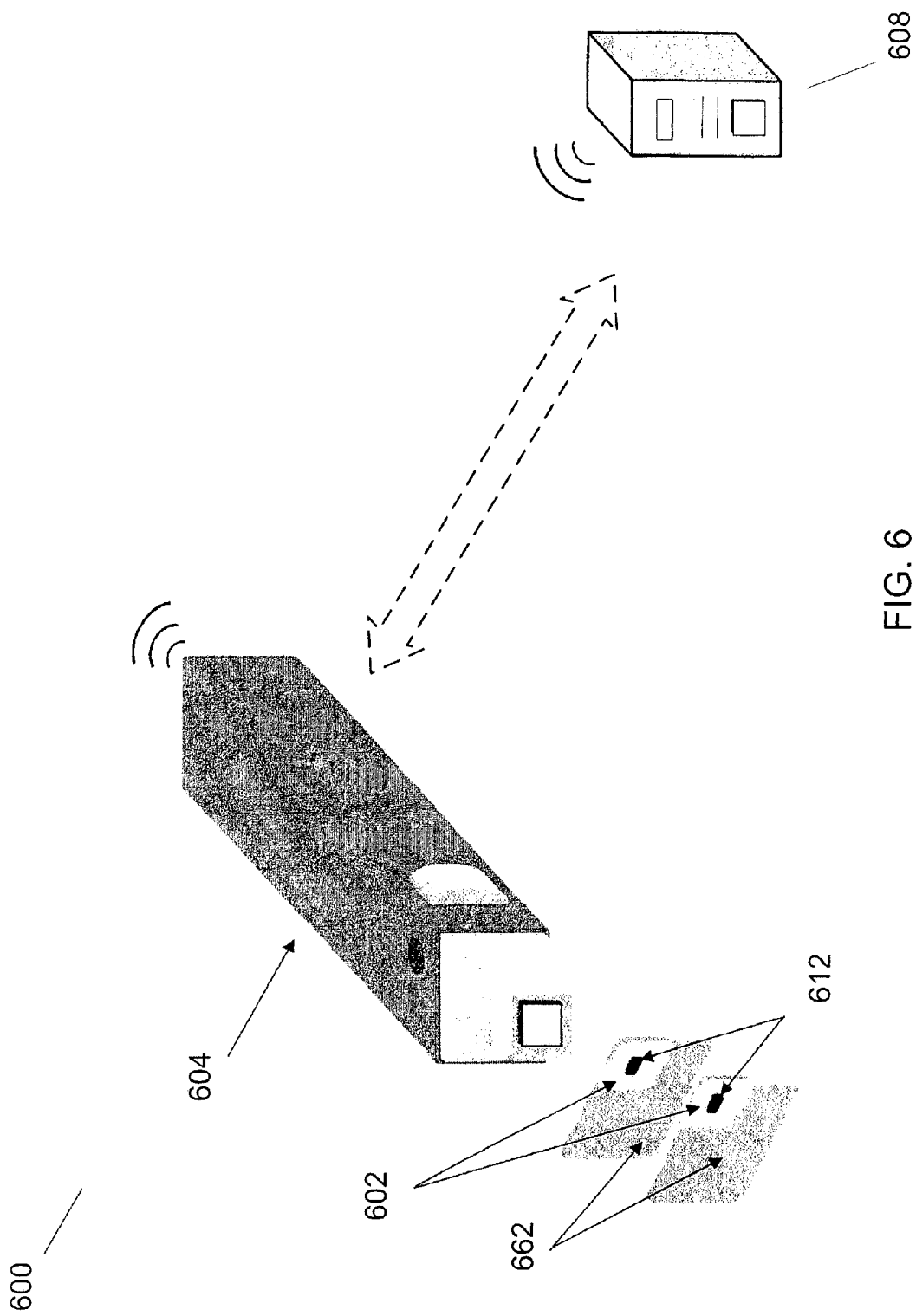
FIG. 6 shows an overall view of an anti-counterfeit system utilizing a reading device that reads inherent disorder features.

FIG. 6 shows an example view, of an anti-counterfeit system 600 utilizing a reading device 604 that reads an inherent disorder feature of a tag or object. The system 600 shown here includes a reading device 604, which communicates with a data server 608. The reading device 604 may, for example, communicate with the database or data server 608 via methods such as using data cables, local area networks, Bluetooth, Wi-Fi, Worldwide Interoperability for Microwave Access (WiMAX) technology, General Packet Radio Service (GPRS), 3G/Universal Mobile Telecommunication System (UMTS), or other communication protocols or technologies. Communication between the reading device 604 and the data server 608 may be direct, or through one or more networks or other communication infrastructure, such as the Internet and/or a cellular telephone network. Although the data server 608 is illustrated as one computer, it is also understood that it may in fact be a series of computers or servers which may or may not be linked via a router or routing protocol. The reading device 604 may also include methods for direct communication with the user, for example a screen and a keyboard, which may allow the user to read and enter information on the reading device 604.

The example identification features as shown in FIG. 6 include a disordered array of magnetic or magnetisable particles forming a magnetic fingerprint region 612, as well as a barcode. Each tag 602 is attached to an object or an item of value 662 to be identified. The reading device 604 may be used for reading the barcode on the tag 602. If there is an indication that the object 662 to which the tag 602 has been attached may be counterfeit, or that the tag 602 has been altered or tampered with, then the reading device 604 can be used to read the magnetic fingerprint region to verify the tag 602. It is generally more difficult to counterfeit, alter, or tamper with the inherent disorder features of the tag 602 than other features, such as a barcode.

The reading device 604 has the capability to communicate with the data server 608 regarding a signal generated front reading identification features in order to authenticate a tag. Encrypted signals from the reading device 604 can be sent either through a wireless connection or a wired connection. Some examples of wireless connection include Bluetooth and Wi-Fi and some examples of wired connection include Recommended Standard 232 (RS232) and Universal Serial Bus (USB). As noted above the communication may be direct, or through a network or other intervening communication infrastructure, such as the Internet, or General Packet Radio Service (GPRS) or 3G/UTMS technology, for example.

In accordance with various embodiments of the invention, an adaptor for reading inherent disorder features may be configured to be connected to a commercially available mobile device, such as a mobile telephone. Many commercially available mobile devices have built-in cameras, which may be used to collect image information. In addition, the communication capabilities of mobile devices, such as mobile telephones, may be used to communicate with a remote data server or database to, e.g., verify identification information. Additionally, in many instances, the mobile device will be able to provide power to the adaptor, to operate items such as LEDs. Where the mobile device is not able to provide power to the adaptor, some embodiments may use external power sources, such as batteries to provide power. Software running on the mobile device can be used to collect an image of a tag from the mobile device's camera, perform any necessary analysis or transformations on the image, and use the image (and/or data derived from the image) to identify and/or verify the item to which the tag is attached.

Figure 7:
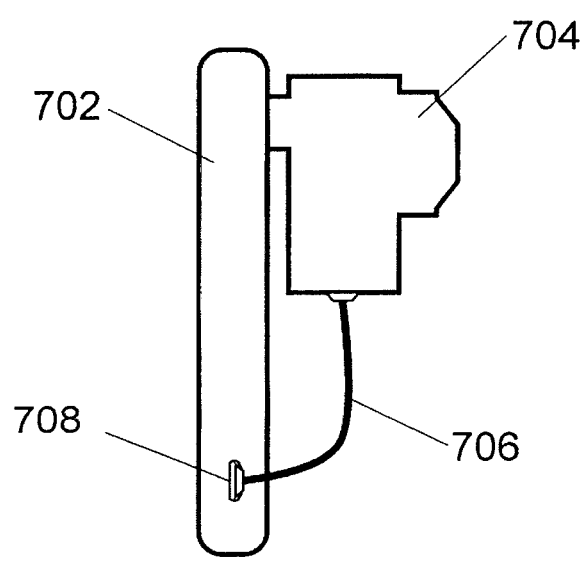
FIG. 7 shows an adaptor attached to a mobile device, such as a commercially available mobile telephone, for reading an inherent disorder feature, in accordance with an embodiment of the invention.

FIG. 7 shows an example view of a mobile device 702—in this example a mobile phone, such as an IPHONE, manufactured by apple computer, of Cupertino, Calif., or an ANDROID phone, such as the GALAXY S, manufactured by Samsung Electronics, of Seoul, Korea, or the HTC DESIRE, manufactured by HTC Corporation, of Taoyuan, Taiwan, connected to an adaptor 704, in accordance with various embodiments of the invention. It will be understood that the mobile phones listed above, which are commercially available at the time of writing, are used only as examples, and that a wide variety of mobile phone models and other mobile devices, which may or may not yet exist at the time of writing, may be attached to an adaptor for reading inherent disorder features, in accordance with embodiments of the invention.

Generally, a portion of the adaptor 704 is connected to the mobile device such that images from the adaptor 704 may be provided to a digital camera (not shown) built in to the mobile device 702. Such cameras typically include a lens or opening (not shown, since it is obscured by the adaptor 704) on an outer surface of the mobile device, such that photographs may be taken using the mobile device by pointing the lens or opening towards the subject of the photo, and using software on the mobile device to digitally store the image. In accordance with embodiments of the invention, the adaptor 704 may direct an image, e.g., of inherent disorder features, to the lens or opening on the outer surface of the mobile device 702, in order to use the mobile device 702 to collect and process images. This permits the optical processing unit shown in the example readers discussed above to be omitted, since the camera-equipped mobile device provides these functions.

In the example embodiment shown in FIG. 7, the adaptor 704 receives power from the mobile device via cord 706, which attaches to a connector 708 on the mobile device 702. Data and instructions may also be communicated between the mobile device 702 and the adaptor 704 via the cord 706 in some embodiments.

In some embodiments, the mobile device 702 may provide power through a connector or interface, such as the connector 708 on the mobile device 702. In some embodiments, the connector 708 may be a standard connector, such as a mini-USB connector, serial port or headphone/microphone jack (not shown). In some embodiments, power may be provided through a standard USB connector, an audio jack (not shown) or through a headphone or microphone jack (not shown) on the mobile device 702. In some embodiments, the mobile device may be unable to provide power, or to provide sufficient power to the adaptor 704, in which case the adaptor 704 may include its own power source, such as batteries (not shown). Instructions or data may also be communicated between the mobile device and the adaptor via an interface or connector, or via a headset or audio connector. In cases where data cannot be exchanged between the adaptor 704 and mobile device 702 in this way, it may be possible for data and instructions to be communicated wirelessly, for example using Bluetooth or other wireless technologies.

As will be illustrated in greater depth below, the adaptor 704 may be connected to the mobile device 702 in a variety of ways, including mechanical connection devices, adhesives, suction, or magnetic connection devices. The adaptor 704 is generally user attachable to the mobile device 702, meaning that the user of the adaptor and/or mobile device may attach the adaptor to any of a variety of commercially available mobile devices, as discussed above. In many embodiments, the adaptor 704 and mobile device 702 may be connected in such a way that the adaptor 704 can be detached from the mobile device 702 when, e.g., it is not in use.

By connecting the adaptor 704 to a mobile device 702, the built-in camera in the mobile device 702 can be used to read tags including inherent disorder features. Additionally, the built-in telecommunications functions of the mobile device 702 may be used to communicate data with an external data server. Further, software running on the mobile device 702 may be used to display images on a display of the mobile device 702, and to interact with a user using an interface provided by the mobile device 702. In some embodiments, the mobile device 702 may further provide power or other services or resources to the adaptor 704. By connecting the adaptor 704 to the mobile device 702, all of these components—a camera, a display and user interface, wireless communications components, etc.—need not be included in the adaptor 704. This may reduce the cost of the adaptor 704, while possibly increasing its usability and capabilities, when it is used in combination with a commercially available mobile device 702. Additionally, because the adaptor 704 is user attachable to the mobile device 702, the user is able to decide which of a variety of mobile devices he or she wishes to use in connection with the adaptor 704.

Figure 8A:
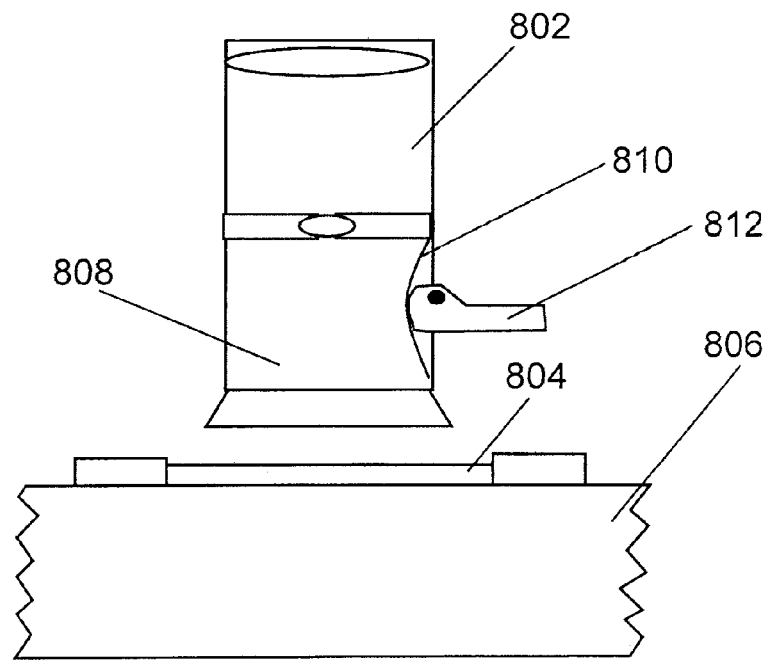
FIGS. 8A and 8B show a suction cup-based attachment device for removably attaching an adaptor to a mobile device, in accordance with an embodiment of the invention.
Figure 8B:
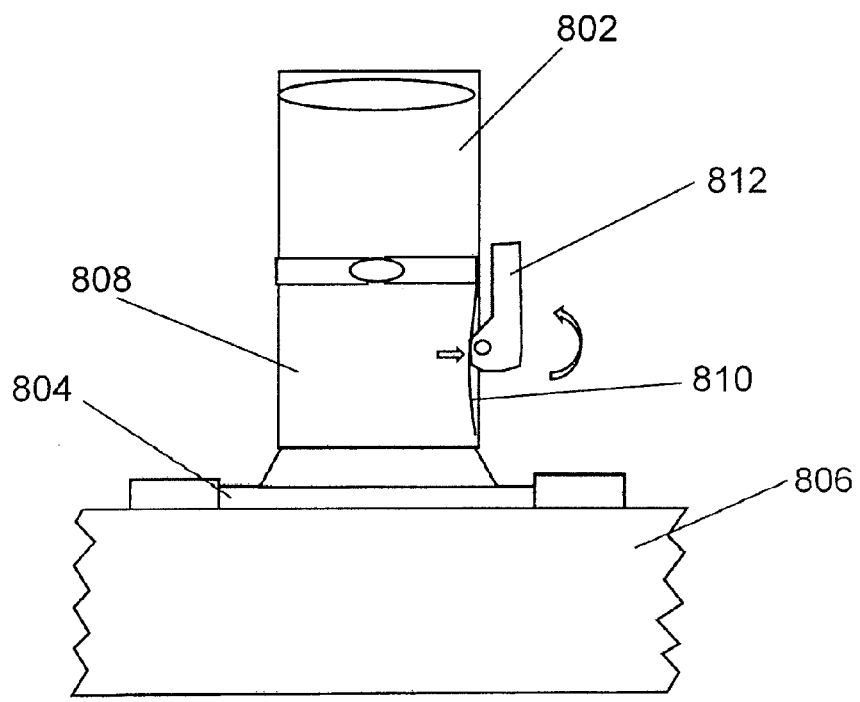

FIGS. 8A and 8B show one possible way in which an adaptor may be removably attached to a mobile device by a user. The embodiment shown in FIGS. 8A and 8B shows a suction cup design, in which an adaptor 802 (only a portion of which is shown) is connected the camera portion 804 of a mobile device 806 using a suction cup 808. In FIGS. 8A and 8B, a suction cup area 808 that uses a deformable diaphragm 810 controlled by a lever 812 to create a change in air pressure is shown. It will, however, be understood that other types of suction cups or suction and/or vacuum-based connection mechanisms could also be used. Note that in FIGS. 8, 9, 10 and 11 in particular, but also in some other images, lenses are represented by a simple ellipse. This is not intended to imply that a double-convex lens is the most suitable lens or optical system for the situation shown. Instead, this merely represents that a lens or lenses may be present. Also, as noted before, these and other images are not necessarily to scale, but are drawn to convey concepts, not strict design specifications.

In FIG. 8A, the adaptor 802 is disconnected from the mobile device 806, but is shown as ready to be connected, since the lever 812 is extended, to deform the diaphragm 810 to reduce the interior space of the suction cup area 808. As shown in FIG. 8B, once the suction cup is sealed in the appropriate position in contact with the camera portion 804 of the mobile device 806, the lever 812 is repositioned so that the diaphragm 810 increases the interior space of the suction cup area 808. Because the edges of the suction cup area 808 are sealed, increasing the interior space reduces the air pressure, creating a suction effect that holds the adaptor 812 in place over the camera portion 804 of the mobile device 806.

Figure 9:
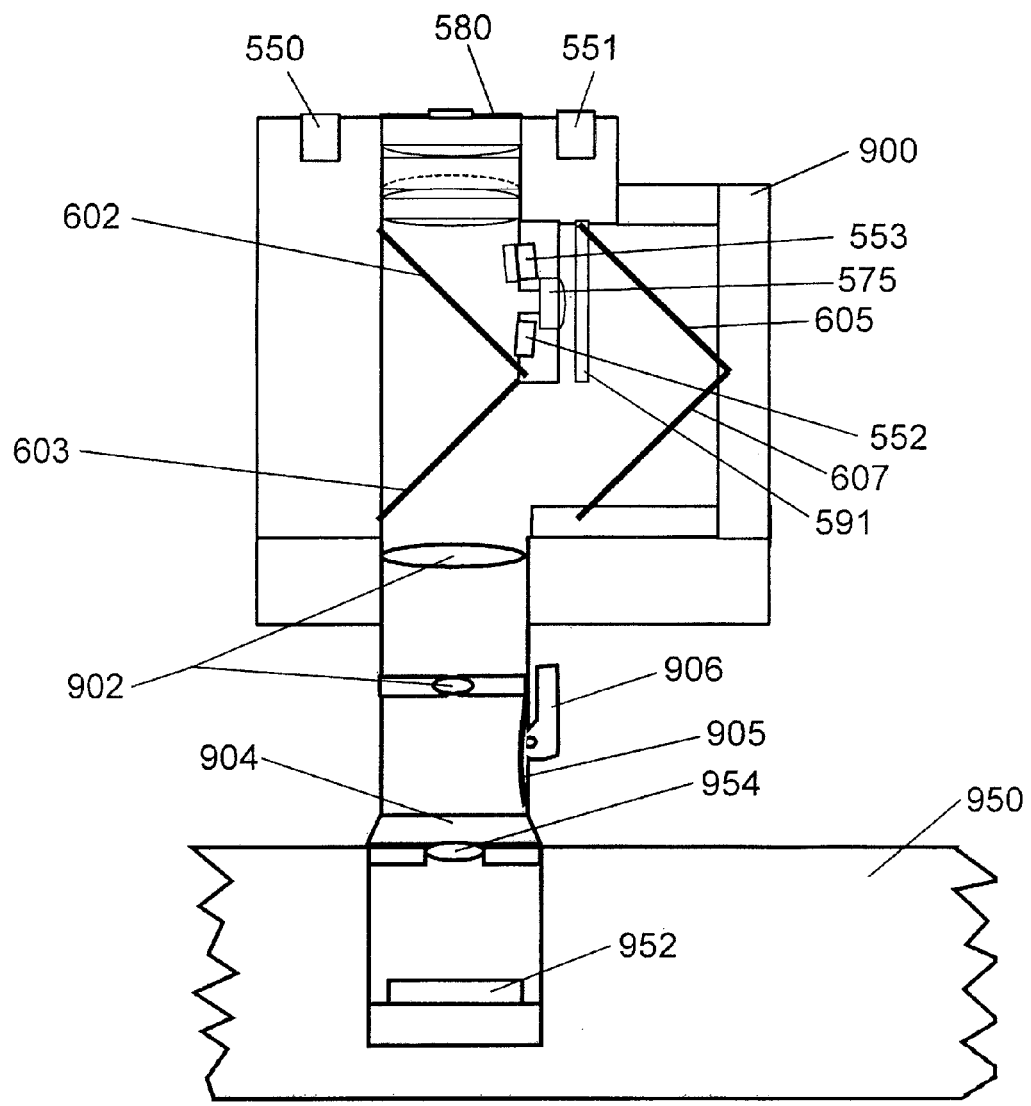
FIG. 9 shows an example of a adaptor for use with a mobile device, in accordance with various embodiments of the invention.

An example of an adaptor for use with a mobile device in accordance with various embodiments of the invention is shown in FIG. 9. As can be seen, the optics of the adaptor 900 are similar to those of the reader discussed with reference to FIGS. 5A and 5B, but the adaptor does not include an optical processing unit, since this is provided by the mobile device to which the adaptor 900 will be connected.

When the adaptor 900 is being used for reading, e.g., a conventional barcode or other optical identification feature, the lighting elements 450 and 451 may be switched on, and the lighting elements 452 and 453 may be switched off. The dichroic mirrors 502 and 503 are configured such that they permit the light from the lighting elements 450 and 451 to pass through, while reflecting the light from the lighting elements 452 and 453. This permits the light from lighting elements 450 and 451, including image information from an optical identification feature to be projected by a lens system 902 of the adaptor 900 and a lens system 954 of a mobile device 950, onto an optical processing unit 952 (e.g., a CCD) of the camera in a mobile device 950 to which the adaptor 900 is attached.

When the adaptor 900 is being used for reading a magnetic inherent disorder feature, the lighting elements 452 and 453 may be switched on, and the lighting elements 450 and 451 may be switched off. Light from the lighting elements 452 and 453 reflects off of a dichroic or reflective layer of the magneto-optical substrate 480, and is reflected by the dichroic mirror 502 so that it passes through the lens system 475 and the polarizer 491 before being directed by the mirrors 505 and 507 and the dichroic mirror 503 through the lens systems 902 and 954, which focus the light onto an optical processing unit 952 of the camera in the mobile device 950.

In the embodiment show in FIG. 9, the adaptor 900 may be attached to the mobile device 950 using a suction cup 904, as described above, which fits over the lens portion (e.g., lens system 954) of the camera on the mobile device 950. Using suction to connect the adaptor 900 to the mobile device 950 permits reasonably accurate placement of the adaptor 900 in a position over the lens system 954 of the camera of the mobile device 950, without blocking or otherwise preventing light from passing from the adaptor 900 to the camera in the mobile device 950. Although the suction cup 904 is shown as a deformable suction cup in which a deformable diaphragm 905 is deformed to adjust the pressure to attach or release the adaptor 900 from the mobile device 950 using a lever 906, other forms of suction cup or attachment device using air pressure or vacuum to attach the adaptor to the mobile device may also be used. The adaptor 900 may also be connected to the mobile device 950 in other ways, as will be discussed in greater detail below. For example, the adaptor 900 may be attached to the mobile device 950 using adjustable mounting brackets that attach to edges or other portions of the mobile device 950, by an adhesive, by magnets (though if the adaptor 900 is reading magnetic signals, care should be taken to avoid interference between the magnetic signal that is being read and the magnets that are used to attach the adaptor 900 to the mobile device 950), or by other attachment means.

In some embodiments, depending on the optics of the mobile device camera, it may not be necessary to include the lens system 902 to arrange proper focus of the image onto the optical processing unit 952. Similarly, the lens system 954 is in the control of the manufacturer of the mobile device 950, and may be omitted in some embodiments, or may be different than is shown in FIG. 9. The optical path to the optical processing unit 952 within the mobile device 950 may also be different than that shown in FIG. 9.

In some embodiments, the lens system 902 may have an adjustable focus, in case it is necessary to change the focus, depending on the mobile device to which the adaptor 900 is attached. This adjustable focus may be user-adjustable, or may be automatically adjustable, e.g., using an actuator (not shown). Because different mobile devices may include cameras having differing characteristics, in some embodiments, the adaptor 900 may need to be adjustable to be connected to numerous different mobile device models or types.

In many embodiments, the adaptor 900 is detachably attached to the mobile device 950. For example, the suction cup 904 that fits over the lens portion of the mobile device 950 permits the adaptor 900 to be detached from the mobile device 950 and reattached to the mobile device 950 or to another mobile device. Because the user is involved in attaching and detaching the adaptor 900, the alignment of the optics between the adaptor 900 and the mobile device 950 may not be precise. As long as the alignment is close to correct, software in the mobile device 950 should be able to compensate for slight differences in the position and rotation of images. In some embodiments, when attaching the adaptor 900, it may be useful to run a quick focus test and calibration before reading tags. In some embodiments, tags or standard test substrates that use registration marks or other detectable indicia of the position and orientation of the tag may be used determine the translation and rotation that should be applied to an image. By viewing the image (perhaps with help of an analysis application running on the mobile device), the user may be able to manually adjust the focus or alignment of the adapter such that it is acceptable. For manual adjustment of the focus, a focusing ring may be included in the adapter (not shown), in which case focusing would be similar to manually focusing a single-lens reflex (SLR) camera. If the adjustment is to be done automatically, then preferably a software application is uploaded on the mobile device that analyzes the image taken (e.g. resolution/focus/magnification) and is able to send a signal to an actuator (e.g. via a USB interface connection between the mobile device and the adaptor) in the adaptor 900 to make necessary adjustments, e.g. this may comprise moving a lens such that the focus is adjusted. Alternately, or in addition, if the mobile device camera allows focusing (or allows other internal adjustment) the focusing mechanism may be controlled by the application to ensure the best image. Alternately, or in addition, if the mobile device camera allows autofocusing this may be utilized to achieve a suitable image.

It will be understood that in accordance with various embodiments of the invention, an adaptor that adapts a mobile device to read any particular form of inherent disorder-based identification features may be used. While the example shown in FIG. 9 and other figures reads an inherent disorder feature based on magnetic particles, adaptors for other types of inherent disorder features could also be used. Generally, to function with the camera provided in a commercially available mobile device, the adaptor should provide an optical image representing the features that have been read. Thus, the adaptor may be seen as providing an optical signal representative of the inherent disorder feature that is being read incident on the camera of a mobile device. In the case of an adaptor that reads a magnetic inherent disorder feature, the adaptor can be said to be creating an image corresponding to a detected magnetic field. Generally, where reflected light is used to read an inherent disorder feature, the adaptor can be seen as modifying a property of an electromagnetic wave (e.g., light reflected off of a magneto-optical substrate) in response to an inherent disorder feature, and ensuring that the modified electromagnetic wave is incident on an imaging device (e.g., the camera or image processing unit) of a mobile device, such that the imaging device is able to derive an image containing information useable for identifying an object. The adaptor can be seen as modifying at least one of the wavelength, magnification, polarization, or energy of an electromagnetic wave in response to the inherent disorder feature.

Figure 10:
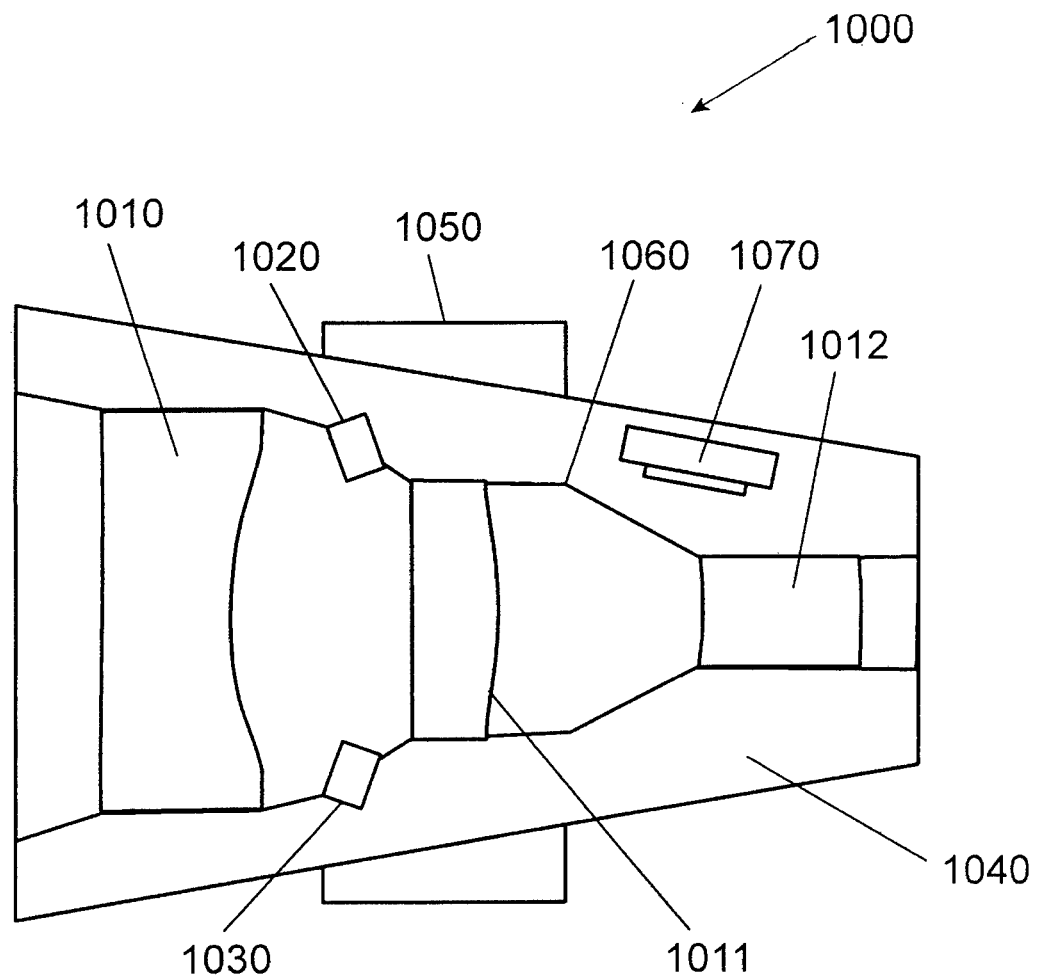
FIG. 10 shows an adaptor for reading an inherent disorder feature including a disordered array of fluorescing particles, in accordance with an embodiment of the invention.

Referring now to FIG. 10, another example system is described, that uses an inherent disorder reader that reads a tag containing a disordered array of fluorescing particles. As before, the adaptor 1000 is connected to a mobile device, such that the adaptor 1000 projects an image representing the position of the fluorescing particles when an activation LED 1020 is illuminated. The activation LED 1020 is selected to emit light at the correct wavelength such that the fluorescing particles fluoresce. When the LED 1030 is illuminated, the other markings on the tag surface are clearly shown/highlighted as LED 1030 is selected such that there is limited or no fluorescence from the particles. Note that both LED 1020 and LED 1030 can be individual LEDs or may be a series of LEDs or other light emitting elements. In addition to the LEDs, the adapter 1000 also includes lenses 1010, 1011 and 1012, a casing 1040, and a small battery 1070 for powering the LEDs. The casing 1040 holds the other elements in place while also facilitating connection to the mobile device (not shown). The adaptor 1000 also has a focusing ring 1050 which, when turned, is able to selectively move the lens 1011 back and forth between the position shown and a second position 1060. This can be achieved by any standard means such as a screw thread (although this mechanism is not shown).

For clarity in this and the other Figures, many components are not shown. For example, the electronic connections which enable the LEDs to be powered are not shown, but would be understood by one of ordinary skill in the art to be present. An adapter in accordance with various embodiments of the invention can also be used for other disordered systems, e.g. where the disorder relies on three-dimensional features and it is important to ensure that the features on the tag in question are, in fact, three dimensional. In this case, light shown sequentially from different angles (i.e. different LED positions) can be used. Systems that use three-dimensionality as a key differentiating feature include the features disclosed, for example, in published US application 2009/0274298 and the previously mentioned in U.S. Pat. No. 7,380,128.

Figure 11:
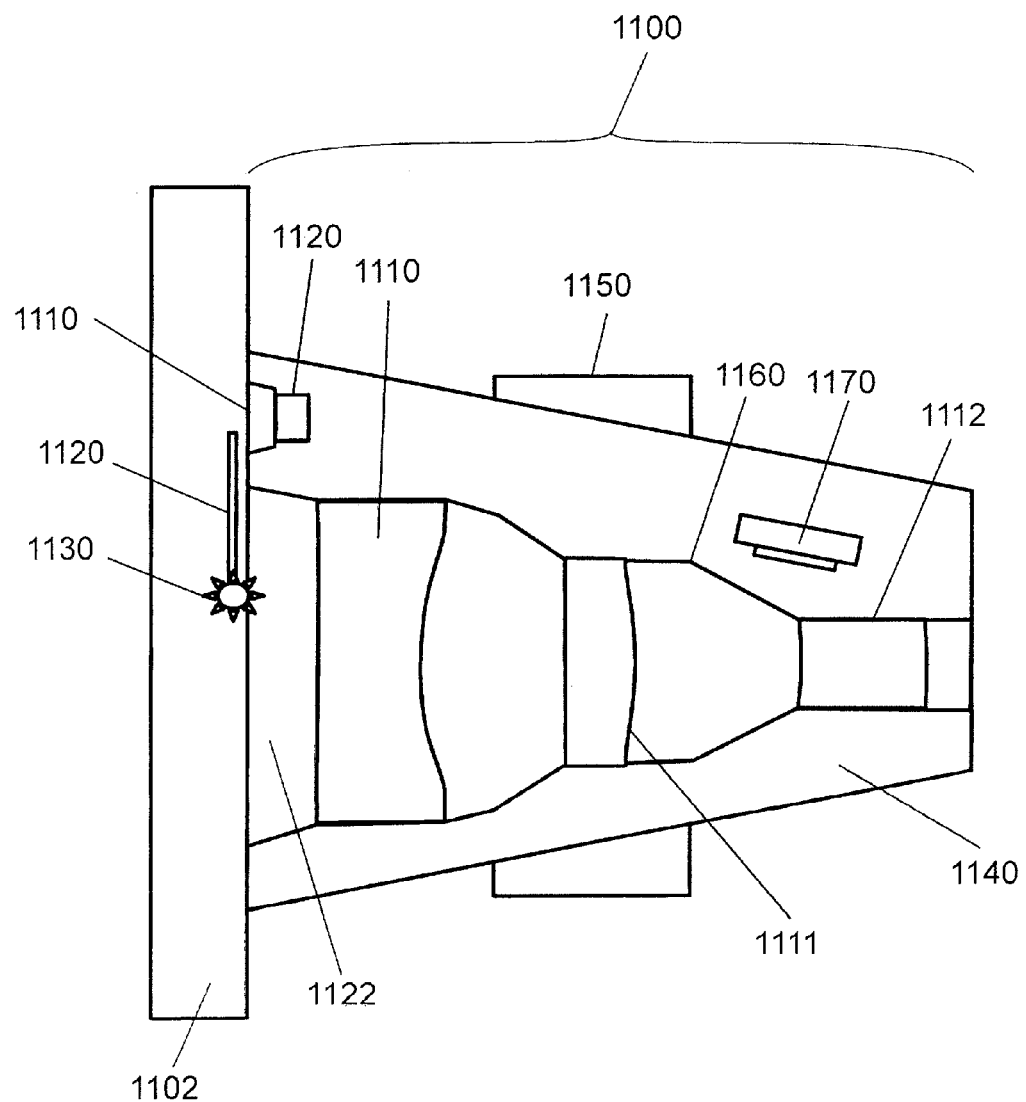
FIG. 11 shows an adaptor for reading an inherent disorder feature including a disordered set of optical fibers, in accordance with an embodiment of the invention.

Referring now to FIG. 11, another example system is described, which uses an inherent disorder reader that reads a tag 1102 containing a disordered set of optical fibers, as is described, for example, in U.S. Pat. No. 7,878,398, granted on 1 Feb. 2011 to Chen et al., and assigned to Microsoft Corporation, of Redmond, Wash. As before, the adaptor 1100 is designed to be connected to a mobile device (not shown). When a light source, such as the LED 1120 is illuminated in the light cavity 1110, light from the LED 1120 enters one end of a set of optical fibers, such as the optical fiber 1120 that are disposed in a disordered manner in a tag or object, such as the tag 1102. The light emerges at the other end of the optical fibers (shown as light 1130), creating a pattern of light from a subset of the set of illuminated optical fibers to form an image within the imaging cavity 1122. This optical image is directed by the adaptor 1100 to a camera in the mobile device (not shown). The adapter 1100 also includes lenses 1110, 1111 and 1112, a casing 1140, and a small battery 1170 for powering the LED 1120. The casing 1140 holds the other elements in place while also facilitating connection to the mobile device (not shown). As above, the adaptor 1100 also has a focusing ring 1150 which, when turned, is able to selectively move the lens 1111 back and forth between the position shown and a second position 1160. This can be achieved by any standard means such as a screw thread (although this mechanism is not shown).

Figure 12:
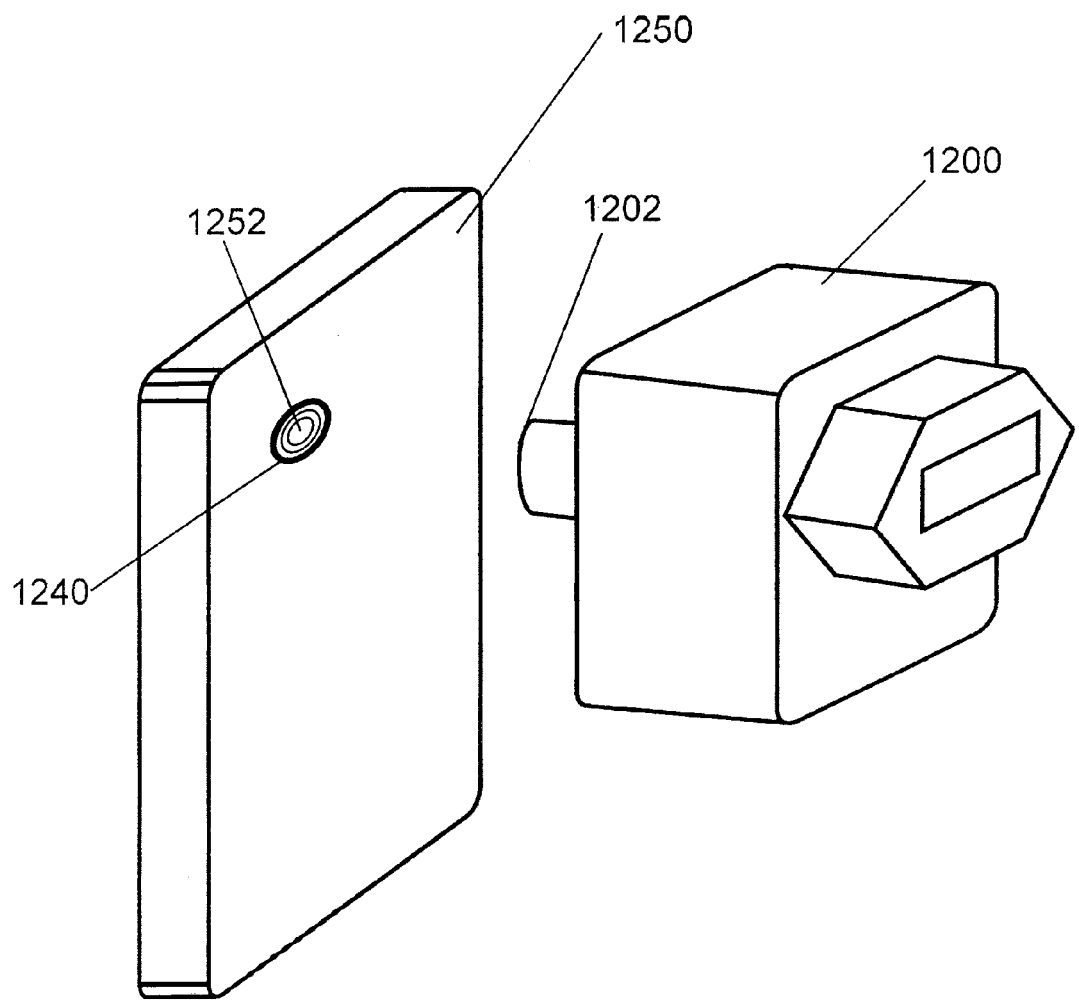
FIG. 12 shows an alternative attachment device attaching an inherent disorder-based adaptor to a mobile device, in accordance with an embodiment of the invention.

FIG. 12 shows another means of attaching an adaptor 1200 to a mobile device 1250. Here, the adaptor 1200 may read any inherent disorder feature, that produces an image that is directed to a camera in the mobile device 1250 through an opening 1202 of the adaptor, and camera lens 1252 of the mobile device. As can be seen in the figure, a ring 1240 is attached to the mobile device 1250, surrounding the camera lens 1252. The ring 1240 is generally relatively flat, so that it will not interfere with use of the camera built in to the mobile device 1250 when the adaptor 1200 is detached. In some embodiments, the ring 1240 may be permanently affixed to the mobile device 1250 using, e.g., a permanent adhesive. In some embodiments, the ring 1240 may be removably attached.

The ring 1240 is designed to couple with a holder inside of the opening 1202 of the adaptor 1200. This may be accomplished in numerous ways. For example, in some embodiments, the ring 1240 includes a small lip (not shown) around its outer edge. This lip may mechanically clip to a holding portion (not shown) inside of the opening 1202. The holding portion may include a spring (not shown), which determines the force that is needed to clip the ring onto the holding portion, or to remove the holding portion from the ring. Alternatively, the holding portion may be threaded, so that a lip on an outer edge of the ring threads into to the holding portion; thereby securing the adaptor 1200 to the mobile device 1250. In an alternative embodiment, the ring 1240 may be magnetic, such that the ring 1240 magnetically couples to an inner portion of the opening 1202.

Figure 13:
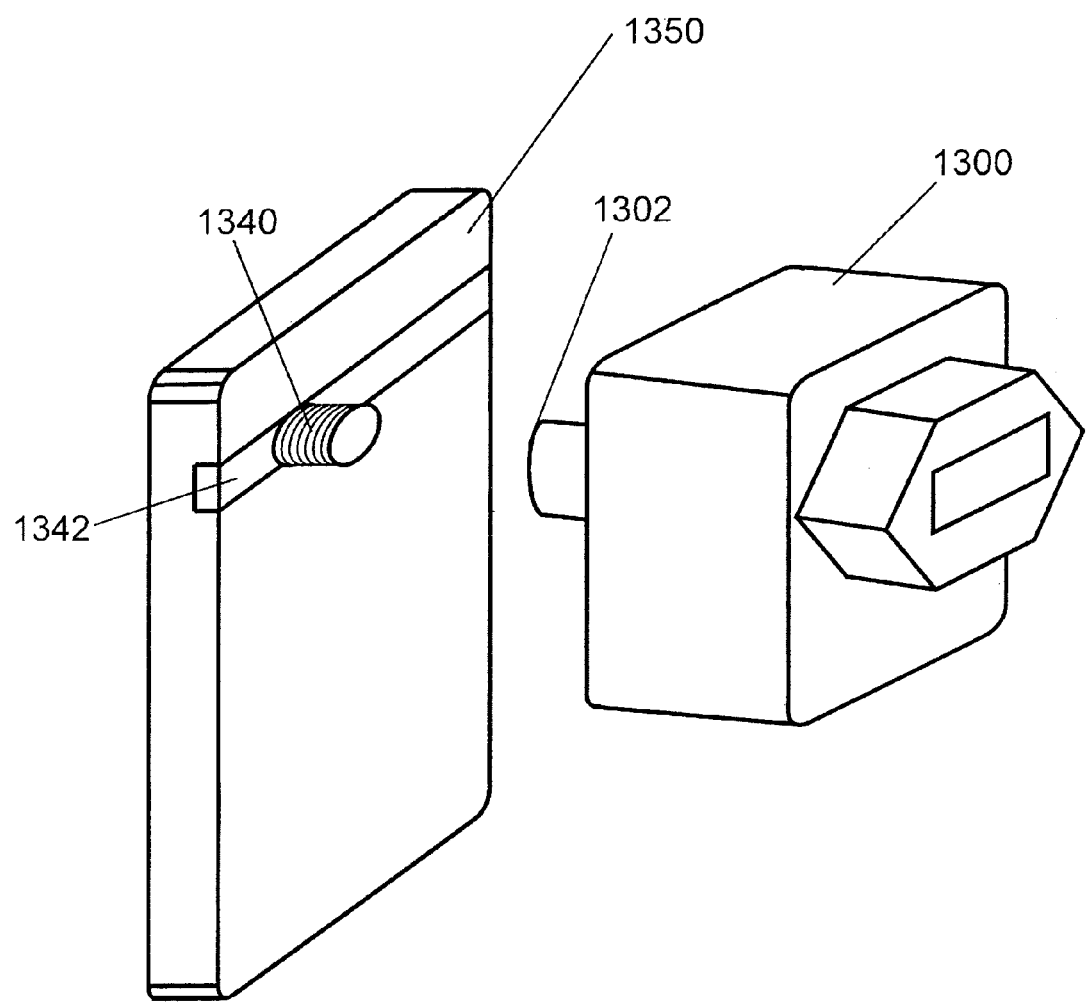
FIG. 13 shows another attachment device that may be used for attaching an inherent disorder-based adaptor to a mobile device, in accordance with an embodiment of the invention.

Another way of attaching an adaptor to a mobile device is shown in FIG. 13. In FIG. 13, a connector 1340 is fitted to the mobile device 1350 using adjustable mounting bracket 1342. The connector 1340 is positioned to surround a camera lens (not shown, since it is obscured by the connector 1340) of the mobile device 1350. The connector 1340 is designed to couple with an inner portion of an opening 1302 of the adaptor 1300. In the example embodiment shown in FIG. 13, the connector 1340 is threaded, and screws into a matching threaded inner surface (not shown) of the opening 1302 of the adaptor 1300. As in previous examples, the connector 1340 may use other coupling means to attach to an inner surface in the opening 1302, such as clipping to an inner surface 1302, as described above, or through use of a magnet.

It will be understood that while several fastening means have been shown for attaching an adaptor to a mobile device, other fastening means could also be used. For example, temporary or re-attachable adhesives, hook and loop fasteners and/or a variety of mechanical fasteners could be used. Additionally, permanent fasteners, such as permanent adhesives could be applied by a user to permanently attach an adaptor to a commercially available mobile device in some embodiments.

Figure 14:
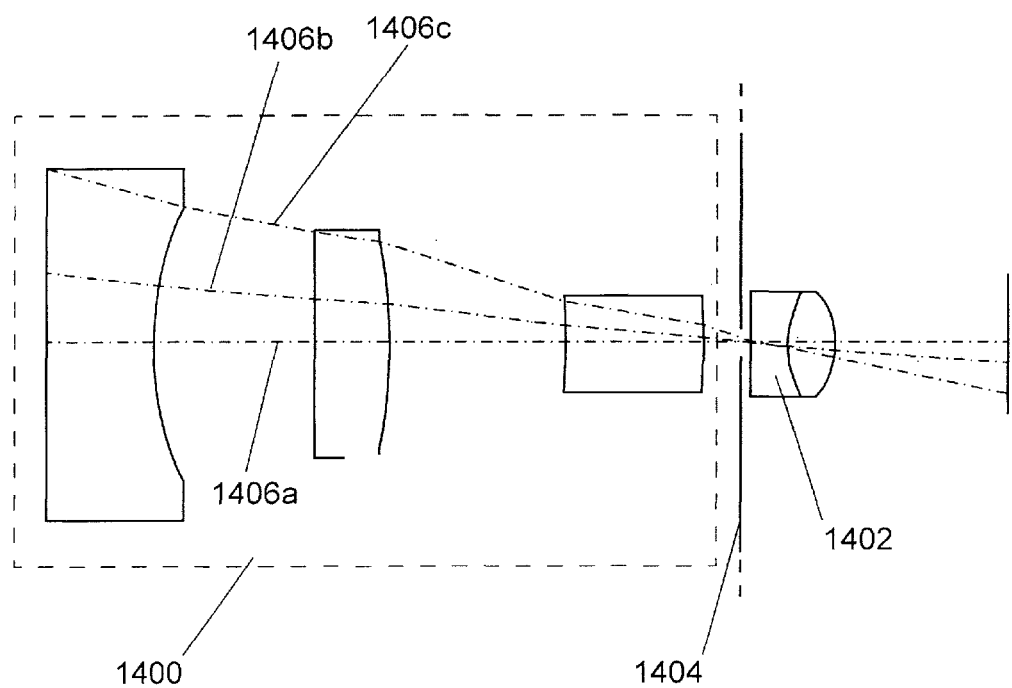
FIG. 14 shows an optical arrangement for use in an adaptor in accordance with an embodiment of the invention.

Referring now to FIG. 14, optics for use in an adaptor according to some embodiments of the invention are described. Generally, the cameras used in mobile devices, such as mobile phones, include wide angle fixed focus lenses, making them suitable for simple mid- to long-range photographic applications. Because of the small scale of many inherent disorder features, an adaptor according to various embodiments of the invention may focus on very small, close features. Accordingly, in some embodiments, the adaptor may include a lens system that converts a wide angle camera, such as is found on many mobile devices, for decreasing the focal length and increasing the magnification to focus on small features. Such a lens system is shown in FIG. 14. FIG. 14 shows a lens system 1400 for use in an adaptor as shown above, that adapts the simple wide-angle doublet lens 1402 that is found in the mobile device 1404 for focusing on small features. Example rays 1406*a-c* are shown to provide an approximate ray trace illustrating the effect of the lens system 1400.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An inherent disorder reader, comprising:
an adaptor that presents information from an inherent disorder feature as an optical signal, the adaptor configured to direct the optical signal onto an optical processing unit built into a camera of a mobile device to generate an image to identify an object, wherein the adaptor is configured to be user attachable to the mobile device, wherein the inherent disorder feature comprises a magnetic inherent disorder feature, and wherein the adaptor uses a magneto-optical substrate to present information from the inherent disorder feature as the optical signal.

2. The inherent disorder reader of claim 1, wherein the adaptor is configured to be removably attached to the mobile device.

3. The inherent disorder reader of claim 1, wherein the mobile device comprises a mobile telephone.

4. The inherent disorder reader of claim 1, wherein the adaptor is configured to be attached to the mobile device using a suction cup.

5. The inherent disorder reader of claim 1, wherein the adaptor is configured to be attached to the mobile device using at least one of a suction-based fastener, a clipping fastener, a magnetic fastener, a threaded fastener, a hook and loop fastener, an adjustable bracket, a reattachable adhesive, and a permanent adhesive.

6. The inherent disorder reader of claim 1, wherein the adaptor is further configured to read an optical feature.

7. The inherent disorder reader of claim 6, wherein the optical feature comprises at least one of a barcode, a two-dimensional barcode, printed text, printed markings, and printed digits.

8. The inherent disorder reader of claim 1, wherein the adaptor comprises an optical system configured to decrease the focal length and increase the magnification of a wide-angle camera in the mobile device, to adapt the camera to focus on small features.

9. An authentication system for identifying an object based on an inherent disorder feature, the system comprising:
a mobile device comprising a built-in digital camera, the mobile device configured to receive an optical signal on the built-in digital camera, and to use the built-in digital camera to generate an image to identify the object; and
an adaptor that presents information from the inherent disorder feature as the optical signal, the adaptor configured to direct the optical signal onto the built-in digital camera, the adaptor further configured to be user attachable to the mobile device, wherein the inherent disorder feature comprises a magnetic inherent disorder feature, and wherein the adaptor uses a magneto-optical substrate to present the information from the inherent disorder feature as the optical signal.

10. The authentication system of claim 9, wherein the mobile device comprises a mobile telephone.

11. The authentication system of claim 9, wherein the mobile device comprises a wireless communication capability that is used to communicate information from the image to a remote server to identify the object.

12. The authentication system of claim 9, wherein the mobile device comprises a user interface, through which the authentication system interacts with a user.

13. The authentication system of claim 9, wherein the mobile device comprises a display that is used to display information relating to identifying the object.

14. The authentication system of claim 13, wherein the display is used to show the image.

15. The authentication system of claim 9, wherein the adaptor receives power from the mobile device.

16. The authentication system of claim 9, wherein the adaptor is configured to be attached to the mobile device using a suction cup.

17. The authentication system of claim 9, wherein the adaptor is configured to be attached to the mobile device using at least one of a suction-based fastener, a clipping fastener, a magnetic fastener, a threaded fastener, a hook and loop fastener, an adjustable bracket, a reattachable adhesive, and a permanent adhesive.

18. The authentication system of claim 9, wherein the adaptor is configured to be removably attached to the mobile device.

19. The authentication system of claim 9, wherein the adaptor further comprises an optical reader that reads an optical feature.

20. The authentication system of claim 19, wherein the optical feature comprises at least one of a barcode, a two-dimensional barcode, printed text, printed markings, and printed digits.

21. The authentication system of claim 9, wherein the adaptor further comprises an optical system configured to decrease the focal length and increase the magnification of the digital camera in the mobile device, to adapt the digital camera to focus on small features.

22. The authentication system of claim 9, wherein the mobile device communicates with a remote database to authenticate the object.

23. The authentication system of claim 9, wherein the mobile device includes software that authenticates the object on the mobile device.

24. A device for identifying an object, the device comprising:
 a mobile device including an imaging device; and
 an adaptor configured to modify a property of an electromagnetic wave in response to an inherent disorder feature on the object to be identified, and to ensure that a modified electromagnetic wave is incident on the imaging device, such that the imaging device is derives an image containing information to identify the object, wherein the inherent disorder feature comprises a magnetic inherent disorder feature, and wherein the adaptor uses a magneto-optical substrate to modify the property of the electromagnetic wave, and wherein the adaptor is configured to be user attachable to the mobile device.

25. The device of claim 24, wherein the mobile device comprises a mobile telephone.

26. The device of claim 25, wherein the adaptor is configured to be user attachable to the mobile device using a suction cup.

27. The device of claim 24, wherein the adaptor is configured to modify at least one of the wavelength, magnification, polarization, and energy of an electromagnetic wave according to an inherent disorder feature.

* * * * *